(12) United States Patent
Wichmann et al.

(10) Patent No.: US 9,353,682 B2
(45) Date of Patent: May 31, 2016

(54) METHODS, SYSTEMS AND APPARATUS RELATING TO COMBUSTION TURBINE POWER PLANTS WITH EXHAUST GAS RECIRCULATION

(75) Inventors: Lisa Anne Wichmann, Simpsonville, SC (US); Stanley Frank Simpson, Simpsonville, SC (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 987 days.

(21) Appl. No.: 13/445,003

(22) Filed: Apr. 12, 2012

(65) Prior Publication Data

US 2013/0269362 A1    Oct. 17, 2013

(51) Int. Cl.
F02C 3/34    (2006.01)

(52) U.S. Cl.
CPC .......................................... F02C 3/34 (2013.01)

(58) Field of Classification Search
CPC ................ F02C 1/06; F02C 1/08; F02C 3/20; F02C 3/34; F02C 16/04; F02C 6/06; F02C 6/08; F02C 6/10; F02C 6/04
See application file for complete search history.

(56) References Cited

U.S. PATENT DOCUMENTS

| | | |
|---|---|---|
| 2,488,911 A | 11/1949 | Hepburn et al. |
| 2,884,758 A | 5/1959 | Oberle |
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |

(Continued)

FOREIGN PATENT DOCUMENTS

| | | |
|---|---|---|
| CA | 2231749 | 9/1998 |
| CA | 2645450 | 9/2007 |

(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.

(Continued)

*Primary Examiner* — Arun Goyal
(74) *Attorney, Agent, or Firm* — Fletcher Yoder P.C.

(57) ABSTRACT

A method of controlling a power plant that comprises a working fluid and a recirculation loop, wherein the power plant includes a combustor operably connected to a turbine, the method including the steps of: recirculating at least a portion of the working fluid through the recirculation loop; controlling the power plant such that the combustor at least periodically operates at a preferred stoichiometric ratio; and extracting the working fluid from at least one of a first extraction point and a second extraction point positioned on the recirculation loop during the periods when the combustor operates at the preferred stoichiometric ratio.

37 Claims, 13 Drawing Sheets

(56) References Cited

U.S. PATENT DOCUMENTS

| | | |
|---|---|---|
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,313,300 A | 2/1982 | Wilkes et al. |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,794,431 A | 8/1998 | Utamura et al. |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,173,562 B1 | 1/2001 | Utamura et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |

(56) References Cited

U.S. PATENT DOCUMENTS

| | | |
|---|---|---|
| 6,263,659 B1 | 7/2001 | Dillon, IV et al. |
| 6,266,954 B1 | 7/2001 | McCallum et al. |
| 6,269,624 B1 * | 8/2001 | Frutschi et al. ............... 60/783 |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen |
| 6,370,870 B1 | 4/2002 | Kamijo et al. |
| 6,374,591 B1 | 4/2002 | Johnson |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |

(56) References Cited

U.S. PATENT DOCUMENTS

| | | |
|---|---|---|
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,950,239 B2 | 5/2011 | Lilley et al. |
| 7,950,240 B2 | 5/2011 | Nemet et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |

(56) References Cited

U.S. PATENT DOCUMENTS

| | | |
|---|---|---|
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare |
| 2008/0251234 A1 | 10/2008 | Wilson |
| 2008/0290719 A1 | 11/2008 | Kaminsky et al. |
| 2008/0309087 A1 | 12/2008 | Evulet et al. |
| 2009/0000762 A1 | 1/2009 | Wilson |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |

(56) References Cited

U.S. PATENT DOCUMENTS

| | | |
|---|---|---|
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0068585 A1 | 3/2011 | Dube et al. |
| 2011/0072779 A1 | 3/2011 | ElKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ElKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1* | 4/2013 | Denton et al. .................. 60/772 |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | |
|---|---|---|
| EP | 0770771 | 5/1997 |
| GB | 776269 | 6/1957 |
| GB | 2117053 | 10/1983 |
| WO | WO9906674 | 2/1999 |
| WO | WO9963210 | 12/1999 |
| WO | WO2007068682 | 6/2007 |
| WO | WO2008142009 | 11/2008 |
| WO | WO2011003606 | 1/2011 |
| WO | 2012003078 A1 | 1/2012 |
| WO | 2012003079 A1 | 1/2012 |
| WO | WO2012003489 | 1/2012 |
| WO | 2012018457 A1 | 2/2012 |
| WO | WO2012128928 | 9/2012 |
| WO | WO2012128929 | 9/2012 |
| WO | WO2012170114 | 12/2012 |
| WO | PCT/RU2013/000162 | 2/2013 |
| WO | PCT/US13/036020 | 4/2013 |
| WO | WO2013147632 | 10/2013 |
| WO | WO2013147633 | 10/2013 |
| WO | WO2013155214 | 10/2013 |
| WO | WO2013163045 | 10/2013 |

OTHER PUBLICATIONS

Air Separation Technology Ion Transport Membrane—Air Products 2008.

Air Separation Technology Ion Transport Membrane—Air Products 2011.

Anderson, R. E. (2006) "Durability and Reliability Demonstration of a Near-Zero-Emission Gas-Fired Power Plant," *California Energy Comm.*, CEC 500-2006-074, 80 pgs.

Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.

Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk. htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, Mar. 2002, 42 pgs.

Comparison of Ion Transport Membranes—Fourth Annual Conference on Carbon Capture and Sequestration DOE/NETL; May 2005.

Ciulia, Vincent. About.com. Auto Repair. How the Engine Works. 2001-2003.

Cryogenics. Science Clarified. 2012. http://www.scienceclarified.com/Co-Di/Cryogenics.html.

Defrate, L. A. et al. (1959) "Optimum Design of Ejector Using Digital Computers" Chem. Eng. Prog. Symp. Ser., 55 (21) pp. 46.

Ditaranto, M. et al. (2006) "Combustion Instabilities in Sudden Expansion Oxy-Fuel Flames," ScienceDirect, Combustion and Flame, v.146, Jun. 30, 2006, pp. 493-451.

Elwell, L. C. et al. (2005) "Technical Overview of Carbon Dioxide Capture Technologies for Coal-Fired Power Plants," *MPR Associates, Inc.*, Jun. 22, 2005, 15 pgs.

Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.

Ertesvag, I. S. et al. (2005) "Exergy Analysis of a Gas-Turbin Combined-Cycle Power Plant With Precombustion $CO_2$ Capture," Elsivier, 2004, pp. 5-39.

Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.

Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.

http://www.turbineinletcooling.org/resources/papers/CTIC_WetCompression_Shepherd_ASMETurboExpo2011.pdf Jun. 2011.

(56) References Cited

OTHER PUBLICATIONS

Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen*, Aug. 3, 2007, 17 pgs.
Reeves, S. R. (2001) "Geological Sequestration of $CO_2$ in Deep, Unmineable Coalbeds: An Integrated Research and Commercial-Scale Field Demonstration Project," *SPE 71749*, 10 pgs.
Reeves, S. R. (2003) "Enhanced Coalbed Methane Recovery," *SPE 101466-DL*, 8 pgs.
Richards, G. A. et al. (2001) "Advanced Steam Generators," *National Energy Technology Laboratory*, 7 pgs.
Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng.*, Norwegian Univ. of Science and Technology, 9 pgs.
vanHemert, P. et al. (2006) "Adsorption of Carbon Dioxide and a Hydrogen-Carbon Dioxide Mixture," *Intn'l Coalbed Methane Symposium* (Tuscaloosa, AL) *Paper 0615*, 9 pgs.
Zhu, J. et al. (2002) "Recovery of Coalbed Methane by Gas Injection," *SPE 75255*, 15 pgs.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.
PCT International Search Report & Written Opinion for PCT Application No. PCT/US2013/036020; dated Jul. 11, 2013.
Cho, J. H. et al. (2005) "Marrying LNG and Power Generation," Energy Markets; 10, 8; ABI/INFORM Trade & Industry, 5 pgs.
Corti, A. et al. (1988) "Athabasca Mineable Oil Sands: The RTR/Gulf Extraction Process Theoretical Model of Bitumen Detachment," 4th UNITAR/UNDP Int'l Conf. on Heavy Crude and Tar Sands Proceedings, v.5, paper No. 81, Edmonton, AB, Canada, 4 pgs.
Nanda, R. et al. (2007) "Utilizing Air Based Technologies as Heat Source for LNG Vaporization," presented at the 86th Annual convention of the Gas Processors of America (GPA 2007), , San Antonio, TX; 13 pgs.
Rosetta, M. J. et al. (2005) "Integrating Ambient Air Vaporization Technology with Waste Heat Recovery—A Fresh Approach to LNG Vaporization," presented at the 85th annual convention of the Gas Processors of America (GPA 2006), Grapevine, Texas, 22 pgs.

\* cited by examiner

US 9,353,682 B2

METHODS, SYSTEMS AND APPARATUS RELATING TO COMBUSTION TURBINE POWER PLANTS WITH EXHAUST GAS RECIRCULATION

BACKGROUND OF THE INVENTION

This application is related to U.S. application Ser. Nos. 13/444,956; 13/444,972, now abandoned; U.S. application Ser. Nos. 13/444,906; 13/444,918; 13/444,929; 13/444,948; 13/444,986; and 13/445,088, now granted as U.S. Pat. No. 8,539,749, all of which were filed concurrently herewith, and which are fully incorporated by reference herein and made a part thereof.

This present application relates generally to combustion turbine engines and systems related thereto. More specifically, but not by way of limitation, the present application relates to methods, systems and/or apparatus for achieving operation at the stoichiometric point and extracting a working fluid having desired characteristics within various types of combustion turbine systems having exhaust gas recirculation.

Oxidant-fuel ratio is the mass ratio of oxidant, typically air, to fuel present in an internal combustion engine. As one of ordinary skill in the art will appreciate, if just enough oxidant is provided to completely burn all of the fuel, a stoichiometric ratio of 1 is achieved (which may be referred to herein as "operating at the stoichiometric point" or "stoichiometric point operation"). In combustion turbine systems, it will be appreciated that combustion at the stoichiometric point may be desirable for several reasons, including lowering emissions levels as well as performance tuning reasons. In addition, by definition, stoichiometric point operation may be used to provide an exhaust (which, in the case of a system that includes exhaust recirculation, may be referred to generally as "working fluid") that is substantially free of oxygen and unspent fuel. More specifically, when operating at the stoichiometric point, the working fluid flowing through certain sections of the recirculation circuit or loop may consists of significantly high levels of carbon dioxide and nitrogen, which, when fed into an air separation unit, may yield substantially pure streams of these gases.

As one of ordinary skill in the art will appreciate, producing gas streams of carbon dioxide and nitrogen in this manner has economic value. For example, the sequestration of carbon dioxide has potential value given current environmental concerns relating to emission of this gas. In addition, pure gas streams of carbon dioxide and nitrogen are useful in many industrial applications. Also, carbon dioxide may be injected into the ground for enhanced oil recovery. As a result, novel power plant system configurations and/or control methods that provide efficient methods by which stoichiometric point operation may be achieved would be useful and valuable. This would be particularly true if novel systems and methods provided effective ways by which existing power plants using reheat and exhaust gas recirculation could achieve improved operation via relatively minor, cost-effective modifications. Other advantages to the systems and methods of the present invention will become apparent to one of ordinary skill in the art given the description of several exemplary embodiments that is provided below.

BRIEF DESCRIPTION OF THE INVENTION

The present application thus describes a method of controlling a power plant that comprises a working fluid and a recirculation loop, wherein the power plant includes a combustor operably connected to a turbine, the method including the steps of: recirculating at least a portion of the working fluid through the recirculation loop; controlling the power plant such that the combustor at least periodically operates at a preferred stoichiometric ratio; and extracting the working fluid from at least one of a first extraction point and a second extraction point positioned on the recirculation loop during the periods when the combustor operates at the preferred stoichiometric ratio.

The present application further describes a power plant configured to include a recirculation loop about which a working fluid is recirculated, the recirculation loop comprising a plurality of components configured to accept an outflow of working fluid from a neighboring upstream component and provide an inflow of working fluid to a neighboring downstream component, wherein the recirculation loop includes: a recirculation compressor; a combustor positioned downstream of the recirculation compressor; a turbine positioned downstream of the combustor; and a recirculation conduit configured to direct the outflow of working fluid from the turbine to the recirculation compressor. The power plant may include: a first extraction means for extracting the working fluid from a first extraction point on the recirculation loop; a second extraction means for extracting the working fluid from a second extraction point on the recirculation loop; means for controlling the power plant such that the combustor at least periodically operates at a preferred stoichiometric ratio; and means for extracting working fluid from at least one of the first extraction means and the second extraction means during the periods when the combustor operates at the preferred stoichiometric ratio.

These and other features of the present application will become apparent upon review of the following detailed description of the preferred embodiments when taken in conjunction with the drawings and the appended claims.

DETAILED DESCRIPTION OF THE INVENTION

Referring now to the figures, where the various numbers represent like parts throughout the several views, FIGS. 1 through 13 provided schematic illustrations of exemplary power plants according to configurations of the present application. As will be explained in further detail below, these power plants include novel system architectures and configurations and/or methods of control that achieve performance advantages given the recirculation of exhaust gases. Unless otherwise stated, the term "power plant", as used herein, is not intended to be exclusionary and may refer to any of the configurations described herein, illustrated in the figures, or claimed. Such systems may include two separate turbines, exhaust gas recirculation, two combustion systems, and/or a heat-recovery steam generator.

Figure 1:
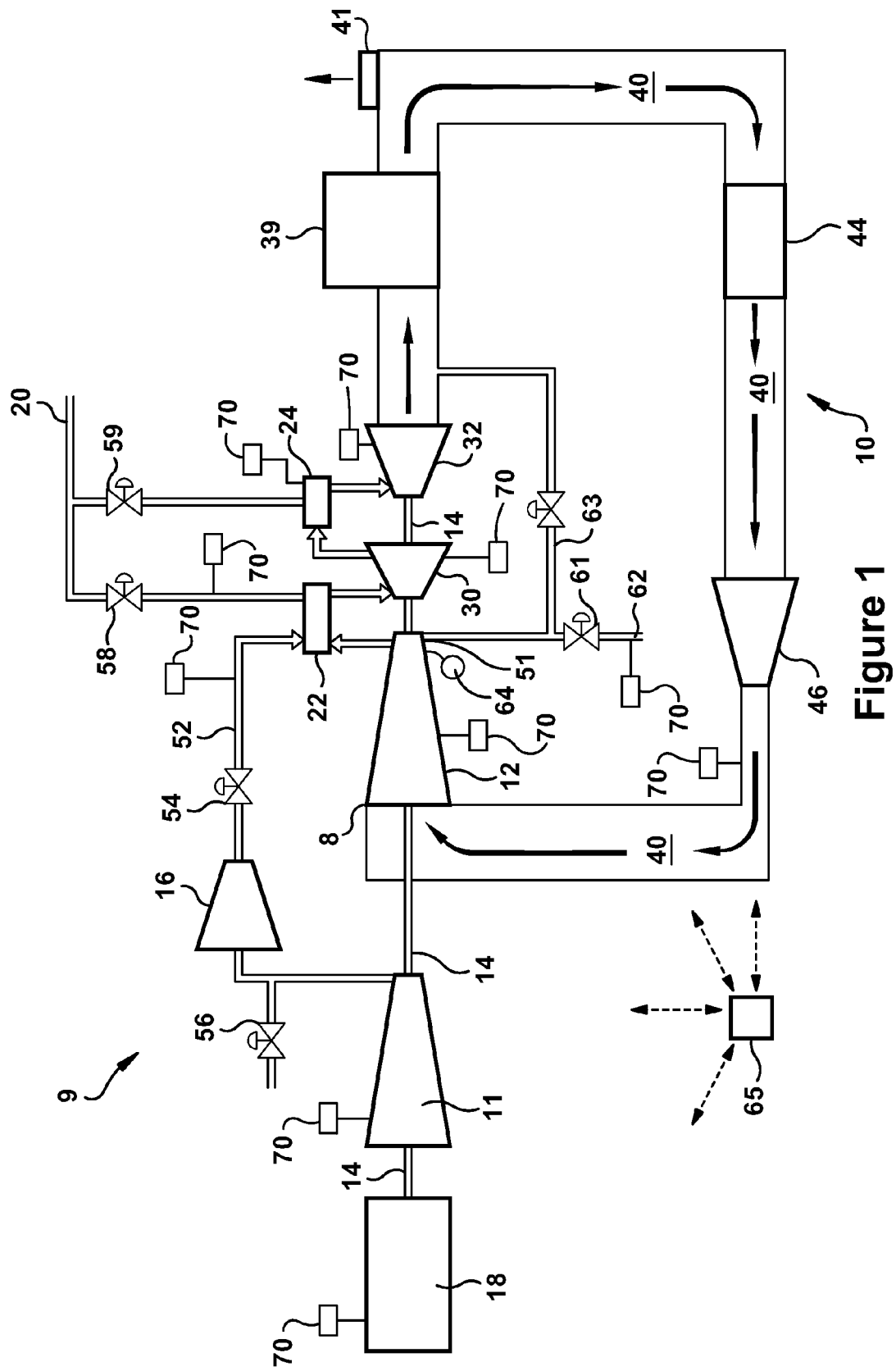
FIG. 1 is a schematic drawing illustrating an exemplary configuration of a power plant employing exhaust gas recirculation and a reheat combustion system.

As illustrated in FIG. 1, the power plant 9 includes a recirculation loop 10 that includes a recirculating flow of working fluid. In certain embodiments of the present invention, as illustrated in FIG. 1, the recirculation loop 10 is the means by which exhaust gas from the turbines recirculates, thereby creating a recirculating flow of working fluid. It will be appreciated that recirculation loop 10 is configured such that each of the components positioned thereon are configured to accept an outflow of working fluid from a neighboring upstream component and provide an inflow of working fluid to a neighboring downstream component. Note that the several components of the recirculation loop 10 will be described in reference to a designated "start position 8" on the loop 10. It will be appreciated that the start position 8 is arbitrary and the function of the system could be described in another manner or in reference to another start position without substantive effect. As shown, the start position 8 is positioned at the intake of an axial compressor 12. As configured, the axial compressor 12 accepts a flow of recirculated exhaust gases from the turbines; accordingly, the axial compressor 12 is referred to herein as "recirculation compressor 12". Moving in a downstream direction, the recirculation loop 10 includes an upstream combustor 22, which is associated with a high-pressure turbine 30, and a downstream combustor 24, which is associated with a low-pressure turbine 32. It will be appreciated that the terms used to describe these components are purposely descriptive so that efficient description of the power plant 9 is possible. While the terms are not meant to be overly limiting, it will be appreciated that the "upstream" and "downstream" designations generally refer to the direction of flow of working fluid through the recirculation loop 10 given the designated start position 8. Further, the "high-pressure" and "low-pressure" designations are meant to refer to the operating pressure levels in each turbine 30, 32 relative to the other given the position of each turbine on the recirculation loop 10.

Downstream of the low-pressure turbine 32, recirculation conduit 40 channels exhaust gases to the intake of the recirculation compressor 12, which thereby recirculates the exhaust gases from the turbines (or, at least, a portion thereof). Several other components may be positioned on the recirculation conduit 40. It will be appreciated that these components may function to deliver the exhaust gases to the recirculation compressor 12 in a desired manner (i.e., at a desired temperature, pressure, humidity, etc.). As shown, in various embodiments, a heat recovery steam generator 39, a cooler 44, and a blower 46 may be included on the recirculation conduit 40. In addition, the recirculation loop 10 may include a recirculation vent 41 which provides a way to controllably vent an amount of exhaust from the recirculation conduit 40 such that a desirable flow balance is achieved. For example, it will be appreciated that under steady state conditions an amount of exhaust must be vented through the recirculation vent 41 that approximately equals the amount of compressed oxidant and fuel entering the recirculation loop 10 via the oxidant compressor 11 and fuel supply 20, respectively. It will be appreciated that achieving a desired balance between oxidant/fuel injected into and exhaust vented from the recirculation loop 10 may be done via sensors recording the amount of compressed oxidant and fuel entering the loop 10 and the amount of exhaust exiting, as well as, temperature sensors, valve sensors, pressure sensors within the recirculation loop 10, and other conventional means and systems.

The power plant 9 may include an oxidant compressor 11, which, unlike the recirculation compressor 12, is not fully integrated into the recirculation loop 10. As provided below, the oxidant compressor 11 may be an axial compressor that is configured to inject compressed air or other oxidant at one or more locations within the recirculation loop 10. In most applications, the oxidant compressor 11 will be configured to compress air. It will be appreciated that, in other embodiments, the oxidant compressor 11 may be configured to supply any type of oxidant which could be pressurized and injected into the combustion system. For example, the oxidant compressor 11 could compress a supply of air doped with oxygen. The recirculation compressor 12, on the other hand, is configured to compress recirculated exhaust gases from the turbines 30, 32. When necessary, a booster compressor 16 may be provided to boost the pressure of the discharge of the oxidant compressor 11 before it is injected into the recirculation loop 10 so that a preferable injection pressure is achieved. In this manner, the compressed oxidant may be effectively delivered to one or more combustors.

The oxidant compressor 11 and the recirculation compressor 12 may be mechanically coupled by a single or common shaft 14 that drives both. A generator 18 may also be included on the common shaft 14, while the high-pressure turbine 30 and the low-pressure turbine 32 drive the common shaft 14 and the loads attached thereto. It will be appreciated that the present invention may be employed in systems having shaft configurations different than the exemplary common shaft configuration 14 illustrated in the figures. For example, multiple shafts may be used, each of which may include one of the turbines and one or more of the load elements (i.e., one of the compressors 11, 12 or the generator 18). Such a configuration may include concentric shafts or otherwise.

In exemplary embodiments, the combustion system of the power plant 9, as shown, includes an upstream combustor 22 and, downstream of that, a downstream combustor 24. It will be appreciated that, as discussed in more detail below, the upstream combustor 22 and the downstream combustor 24 may include any type of conventional combustors, combustion systems and/or reheat combustors, and the chosen terminology refers only to relative positioning on the recirculation loop 10 (given the designated start position 8 and direction of flow). Typically, as depicted in FIG. 1 and discussed in more detail below, the upstream combustor 22 operates by injecting into the recirculation loop 10 combustion gas resulting from a fuel being combusted in a can combustor or other type of conventional combustor. Alternatively, certain combustion systems operate by direct fuel injection. Upon injection, the injected fuel combusts within the recirculation loop 10. Either of these methods generally increases the temperature and the kinetic energy of the working fluid, and either of the combustor types may be employed as the upstream combustor 22 or the downstream combustor 24. A fuel supply 20 may supply fuel, such as natural gas, to the upstream combustor 22 and the downstream combustor 24.

More specifically, the upstream combustor 22 may be configured to accept the flow of compressed oxidant from the oxidant compressor 11 and a fuel from the fuel supply 20. In this mode of operation, the upstream combustor 22 may include one or more cans or combustion chambers within which fuel and oxidant are brought together, mixed, and ignited such that a high energy flow of pressurized combustion gases is created. The upstream combustor 22 then may direct the combustion gases into the high-pressure turbine 30, where the gases are expanded and work extracted. The downstream combustor 24 may be configured to add energy/heat to the working fluid at a point downstream of the high-pressure turbine 30. As shown in the embodiment of FIG. 1, the downstream combustor 24 may be positioned just upstream of the low-pressure turbine 32. As stated, the downstream combustor 24 is so-called because it adds heat/energy to the flow of working fluid at a point downstream of the upstream combustor 22.

As one of ordinary skill in the art will appreciate, certain operational advantages may be achieved using a dual combustion or reheat system such as those described above. These advantages include, among other things: 1) fuel flexibility; 2) improved emissions; 3) lower overall firing temperatures; 4) less cooling and sealing requirements; 5) longer part life; and 6) use of less expensive materials due to lower firing temps. Accordingly, improving the operation of power plants that include reheat systems, as provided by the present invention, widens the potential usage of reheat systems and the realization of the advantages these systems typically provide.

As mentioned, the power plant 9 further includes recirculation conduit 40. The recirculation conduit 40, in general, forms the flow path by which exhaust from the turbines is recirculated, thereby completing the recirculation loop 10. More specifically, the recirculation conduit 40 directs the exhaust from the low pressure turbine 32 on a path that ends at the intake of the recirculation compressor 12. It will be appreciated that the recirculation conduit 40 may circulate the exhaust through several components along the way, including, as indicated in FIG. 1, a heat-recovery steam generator 39, a cooler 44, and a blower 46. (Note that, to avoid unnecessary complexity, the heat-recovery steam generator 39 has been represented in a simplified form in FIG. 1.) Those of ordinary skill in the art will appreciate that the heat-recovery steam generator 39 of the present invention may include any type of system in which combustion exhaust from one or more combustion turbines is used as the heat source for the boiler of a steam turbine.

Downstream of the heat-recovery steam generator 39, the cooler 44 may be positioned such that gases flowing through the recirculation conduit 40 flow through it. The cooler 44 may include a direct contact cooler or other conventional heat exchanger that suffices for this function, and may operate by extracting further heat from the exhaust gases such that the exhaust gases enter the recirculation compressor 12 at a desired or preferred temperature. The cooler 44 may also provide means by which humidity levels within the recirculated gases is controlled to preferable levels. That is, the cooler 44 may extract water from the flow through cooling it, which thereby lowers the humidity level of the recirculated gases upon the gases being heated to the temperature of the flow before entering the cooler. As illustrated in FIG. 1, the blower 46 may be located downstream of the cooler 44; however, as one of ordinary skill in the art will appreciate, this order may be reversed. The blower 46 may be of a conventional design. The blower 46 may function to more efficiently circulate the exhaust gases through the recirculation conduit 40 such that the gases are delivered to the intake of the recirculation compressor 12 in a desired manner.

Figure 2:
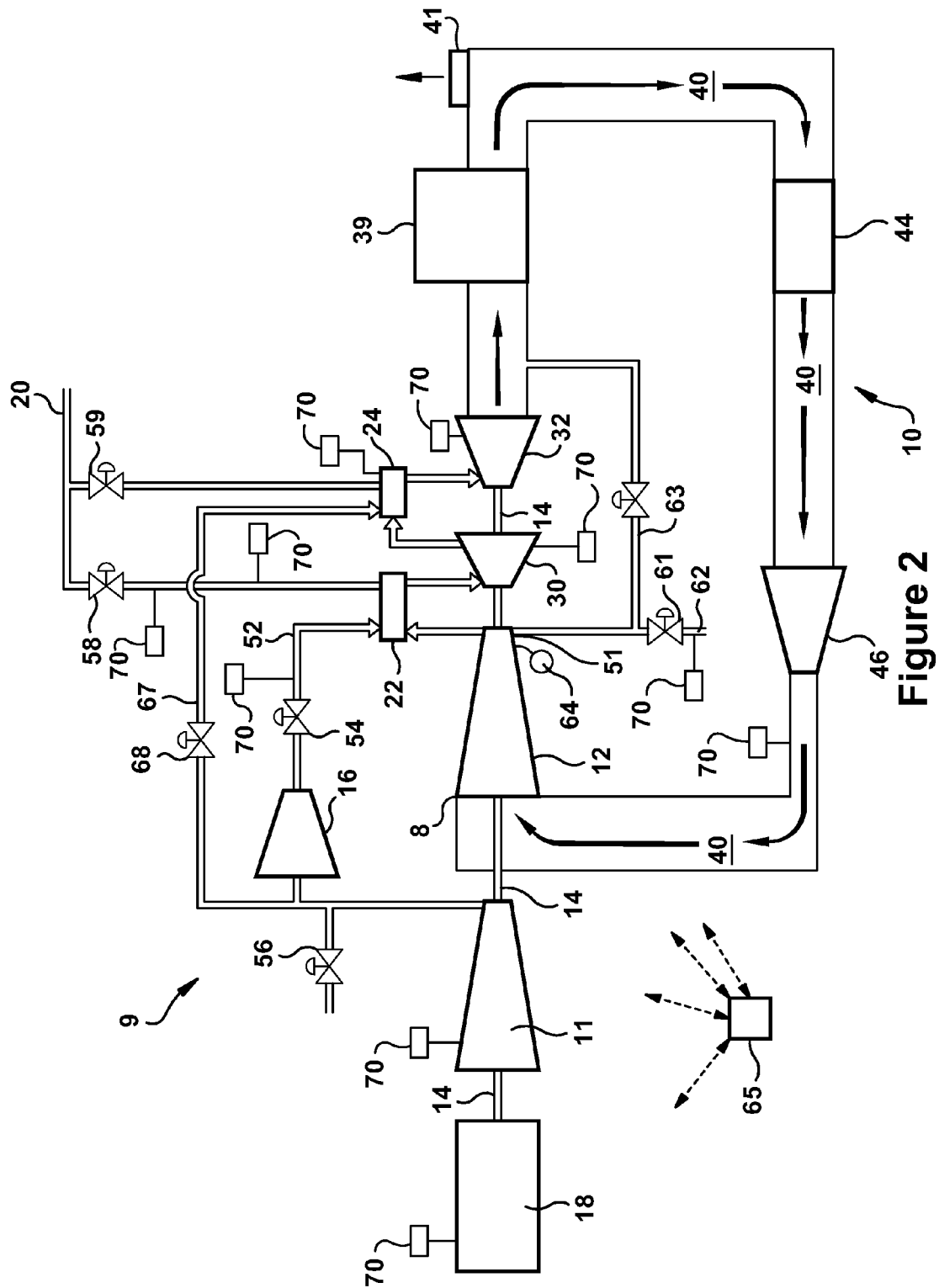
FIG. 2 is a schematic drawing illustrating an alternative configuration of a power plant employing exhaust gas recirculation and a reheat combustion system.

The power plant 9 may include several types of conduits, pipes, valves, sensors and other systems by which the operation of the power plant 9 is controlled and maintained. It will be appreciated that all valves described herein may be controlled to various settings that affect the amount of fluid passing through the conduit. As already described, the recirculation conduit 40 recirculates exhaust gases from the turbines 30, 32 to the intake of the recirculation compressor 12, thereby providing a recirculating flow path for the working fluid. In addition, as indicated in FIG. 1, a first oxidant conduit 52 may be provided that directs the compressed oxidant from the oxidant compressor 11 to the upstream combustor 22. The first oxidant conduit 52 may include an oxidant valve 54 that controls the flow of oxidant through this conduit. The first oxidant conduit 52 further may include the booster compressor 16, which, as described in more detail below, may be used to boost the pressure of the compressed oxidant within this conduit. The first oxidant conduit 52 may further include a vent valve 56. The vent valve 56 provides means by which a portion of the compressed oxidant moving through the first oxidant conduit 52 is vented to atmosphere. As indicated in FIG. 1, certain embodiments of the present invention operate by providing a flow of compressed oxidant from the oxidant compressor 11 to the upstream combustor 22, but not the downstream combustor 24. In other embodiments, such as those shown in FIGS. 2 through 5, the present invention operates by providing a flow of compressed oxidant from the oxidant compressor 11 to the upstream combustor 22 and the downstream combustor 24. In still other embodiments, the present invention operates by providing a flow of compressed oxidant from the oxidant compressor 11 to the downstream combustor 22 but not the upstream combustor 24. This type of system, for example, is represented in FIGS. 2 and 4 when the oxidant valve 54 on the first oxidant conduit 52 is completely shut (i.e., set so that no flow from the oxidant compressor 11 is allowed to pass therethrough).

The fuel supply 20 may include two supply conduits that provide fuel to the upstream combustor 22 and/or the downstream combustor 24. As shown, a fuel valve 58 controls the amount of fuel being delivered to the upstream combustor 22, while another fuel valve 59 controls the amount of fuel being delivered to the downstream combustor 24. It will be appreciated that, though not shown in the figures, the fuel types delivered to the upstream combustor 22 and the downstream combustor 24 do not have to be the same, and that the use of different fuel types may be advantageous given certain system criteria. In addition, as discussed in more detail below, the fuel valve 58 and the fuel valve 59 may be controlled so that fuel is delivered to only one of the two combustors 22, 24. More specifically, in certain embodiments, the fuel valve 58 may be completely shut so that fuel is not delivered to the upstream combustor 22. In this case, as discussed in more detail below, both combustors 22, 24 may operate per the fuel delivered to the downstream combustor 24. Similarly, in certain embodiments, the fuel valve 59 may be completely shut so that fuel is not delivered to the downstream combustor 22.

In this case, as discussed in more detail below, both combustors 22, 24 may operate per the fuel delivered to the upstream combustor 22. It will be appreciated that systems described herein as operating with a valve that is shut completely is intended to cover system configurations where the conduit on which the shut valve is positioned is omitted altogether.

An extraction point 51 comprises the point at which gases are extracted from the working fluid. In preferred embodiments, the extraction point 51 is positioned on the recirculation loop 10 such that carbon dioxide ($CO_2$) and/or nitrogen ($N_2$) may be efficiently extracted. Given certain modes of operation and system control, the system architecture of the present invention allows for such extraction to occur at a position that, as illustrated in FIG. 1, is upstream of both the high-pressure turbine 30 and the upstream combustor 22. More specifically, as shown, the extraction point 51 may be located at a position that is just upstream of the combustion reaction in the upstream combustor 22. The extraction point 51 may include conventional extracting means by which a portion of the gases within the working fluid are diverted into a conduit and, thereby, removed from the recirculation loop 10. An extracted gas valve 61 may be provided to control the amount of working fluid that is extracted. Downstream of the extracted gas valve 61, the conduit may deliver an extracted gas supply 62 to one or more downstream components (not shown). In preferred embodiments, the extracted gas supply 62 may be directed to a separation system (not shown) that separates the carbon dioxide from the nitrogen per conventional means. As stated, after separation, these gases may be used in many types of industrial applications, such as, for example, applications in the food and beverage industry.

Branching from the conduit that connects to the extraction point 51, a turbine bypass conduit 63 also may be included that provides a pathway that bypasses each of the turbines 30, 32. The turbine bypass conduit 63 is provided for startup situations, and, because it does not meaningfully impact the function of the present invention, will not be discussed further.

In other embodiments, the extraction point 51 may be located in different locations within the recirculation loop 10 of FIG. 1. As described in more detail below (particularly with regard to FIGS. 5 and 6), the architecture and control methods provided herein teach efficient and effective means by which one of the combustors 22, 24 may be operated at or near the stoichiometric point or a preferred stoichiometric ratio. That is, the fuel and oxidant supply within the power plant 9 may be controlled in such a way that, once the oxidant and fuel have adequately mixed, ignited and combusted within one of the combustors 22, 24, an exhaust that is free or substantially free of oxygen and unspent fuel is produced. In this condition, the exhaust consists of high levels of carbon dioxide and nitrogen, which may be economically extracted for use in other applications. As stated, "operation at the stoichiometric point" or "stoichiometric point operation" refers to operation at, near or within an acceptable or desired range about the stoichiometric point. It will be appreciated that "stoichiometric point" may also be referred to a stoichiometric ratio of 1, as it is said to include a 1-to-1 ratio of fuel and oxidant. It will further be appreciated that ratios that are greater than 1 are described as containing excess oxidant, while ratios less than 1 are described as containing excess fuel. It will be appreciated that, depending on the limitations of a particular power plant, the desired properties of the extracted working fluid, as well as other criteria, stoichiometric point operation may refer to stoichiometric operation within a range about the stoichiometric point or, put another way, a stoichiometric ratio of 1. Accordingly, in certain embodiments, "stoichiometric point operation" may refer to operation within the range of stoichiometric ratios defined between 0.75 and to 1.25. In more preferable embodiments, "stoichiometric point operation" may refer to operation within the range of stoichiometric ratios defined between 0.9 and to 1.1. In still more preferable embodiments, "stoichiometric point operation" may refer to operation that is substantially at or very close to a stoichiometric ratio of 1. Finally, in other preferable embodiments, "stoichiometric point operation" may refer to operation within the range of stoichiometric ratios defined between approximately 1.0 and to 1.1.

It will be appreciated that if one of the combustors 22, 24 is operated at the stoichiometric point (i.e., a stoichiometric ratio of 1 or within one of the predefined ranges described above or another desired range), the exhaust downstream of the combustor is substantially devoid of unspent fuel and oxygen, and consists substantially of carbon dioxide and nitrogen gas (and/or some other desirable gaseous characteristic), which may be economically extracted. As a result of this, pursuant to embodiments of the present invention, the extraction point 51 generally may be located at any point on the recirculation loop 10 that is both: 1) downstream of the whichever combustor 22, 24 is operating at the stoichiometric point and 2) upstream of the other combustor 22, 24. (It will be appreciated by those of ordinary skill in the art that "upstream of the other combustor", as used herein, means upstream of the point within the combustor at which oxidant and/or fuel actually enters the recirculation loop 51, and that, because of this, "upstream of the other combustor" may include areas that might be construed as within the "other combustor" but which are also upstream of the position at which oxidant and/or fuel is injected into the flow of working fluid, such as, for example, certain areas within a combustor head-end. In a configuration like FIG. 1, assuming that the fuel input of the downstream combustor 24 is controlled to produce combustion at (or substantially at) the stoichiometric point, the extraction point 51 may be located at any point within a range defined between the downstream combustor 24 and, proceeding in a downstream direction, the upstream combustor 22. In one preferred embodiment, as illustrated in FIG. 1, the extraction point may be located within this range at the discharge of the recirculation compressor 12. It will be appreciated that this location provides extracted gas that is highly pressurized, which may be advantageous in certain downstream uses.

The power plant 9 may further include one or more sensors 70 that measure operating parameters, settings, and conditions within the components and various conduits of the system. One such sensor may be a sensor for detecting excess oxidant 64, such as, for example, a conventional oxygen sensor. The sensor for detecting excess oxidant 64 may be positioned just upstream of the extraction point 51 and may measure at predefined intervals the oxygen content of the exhaust or working fluid flowing through the recirculation loop 10. Positioned thusly, the sensor for detecting excess oxidant 64 may be well situated to test the working fluid for oxidant content, which may provide information as to stoichiometric ratio within the combustor directly upstream of the sensor for detecting excess oxidant 64 and/or whether extraction of the working fluid would yield a gas supply that is suitably free of oxidant and unspent fuel. It will be appreciated that the sensor for detecting excess oxidant 64 may be positioned within a range on the recirculation loop 10 that is defined between the extraction point 51 and, proceeding in the upstream direction, the first combustor 22, 24 that is encountered. It will be appreciated that, given the positioning of the extraction point 51, the first combustor 22, 24 encountered in the upstream direction is the combustor 22, 24 which is being controlled at the preferred stoichiometric ratio. In this manner, the sensor for detecting excess oxidant 64 may be used to determine the current desirability of extracting gas from the recirculation loop 10. As described in more detail below, the system may include other sensors 70 that measure a host of process variables that may relate to any of the components of the system. Accordingly, the figures indicate a plurality of sensors 70 at exemplary locations about the power plant 9. As one of ordinary skill in the art will appreciate, conventional systems typically include many sensors other than just those represented in the several figures, and, further, that those other sensors may be located in other locations within the system than just those indicated. It will be appreciated that these sensors 70 may electronically communicate their readings with the control unit 65 and/or function pursuant to instructions communicated to them by the control unit 65. One such sensor 70 that could be used either together or interchangeably with the sensor for detecting excess oxidant 64 is a sensor that detects the presence of unspent fuel in the exhaust. Teamed with the sensor for detecting excess oxidant 64, an unspent fuel sensor 70 could provide measurements from which the stoichiometric ratio in the upstream combustor 22, 24 could be determined as well as the current suitability of extracting working fluid. Those skilled in the art will appreciate that other sensors may be used to collect data concerning the stoichiometric properties of the combustion occurring within the combustors. For example, a CO sensor and a humidity sensor may be used.

The power plant 9 may further include a control unit 65 that functions according to certain embodiments described herein. It will be appreciated that the control unit 65 may include an electronic or computer implemented device that takes in data from sensors and other sources regarding plant operational parameters, settings, and conditions, and, pursuant to algorithms, stored data, operator preferences, etc., controls the settings of the various mechanical and electrical systems of the power plant 9 such that desired modes of operation are achieved. For example, the control unit 65 may control the power plant 9 such that stoichiometric operation or operation at a preferred stoichiometric ratio is achieved in one of the combustors 22, 24. It will be appreciated that the control mechanism may achieve this objective by balancing the fuel and oxidant injected into the either the upstream or downstream combustor 22, 24, as well as taking into account any excess oxidant or unspent fuel from the other of the two combustor 22, 24 that travels within the recirculating working fluid. Once stoichiometric operation is achieved, the control unit 65 may control the extracted gas valve 61 such that extraction takes place at a desired rate and for a desired period of time or until changing conditions make the extraction no longer suitable. The settings of the various valves described above that govern the flow of working fluid, extraction of gases, fuel consumption, etc. may be controlled pursuant to electrical signals, which may be sent via wired or wireless communication connections, received from the control unit 65.

In use, the power plant 9 according to an exemplary embodiment may operate as follows. The rotation of blades within oxidant compressor 11 compresses oxidant that is supplied, via the first oxidant conduit 52 to the upstream combustor 22. Before reaching the upstream combustor 22, the booster compressor 16 may be provided in some embodiments. The booster compressor 16 may be used to increase the pressure of the oxidant being supplied by the oxidant compressor 11 to a level that is adequate or preferable for injection into the upstream combustor 22. In this manner, the flow of compressed oxidant may be joined within the upstream combustor 22 with a flow of compressed exhaust gases, which is supplied to the combustor from the recirculation compressor 12. It will be appreciated that successfully bringing together two such flows within the upstream combustor 22 may be accomplished in several ways and that, depending on how the flows are introduced within the upstream combustor 22, suitable pressure levels for each may vary. The present invention teaches methods and system configurations by which pressure levels may be controlled such that the flows may be combined in a suitable manner, while avoiding avoidable aerodynamic losses, backflow, and other potential performance issues.

Accordingly, the upstream combustor 22 may be configured to combine the flow of compressed oxidant from the oxidant compressor 11 with the flow of compressed exhaust gases from the recirculation compressor 12 and combust a fuel therein, producing a flow of high-energy, pressurized combustion gases. The flow of combustion gases then is directed over the stages of rotating blade within the high-pressure turbine 30, which induces rotation about the shaft 14. In this manner, the energy of the combustion gases is transformed into the mechanical energy of the rotating shaft 14. As described, the shaft 14 may couple the high-pressure turbine 30 to the oxidant compressor 11 so that the rotation of the shaft 14 drives the oxidant compressor 11. The shaft 14 further may couple the high-pressure turbine 30 to the recirculation compressor 12 so that the rotation of the shaft 14 drives the recirculation compressor 12. The shaft 14 also may couple the high-pressure turbine 30 to the generator 18 so that it drives the generator 18 as well. It will be appreciated that the generator 18 converts the mechanical energy of the rotating shaft into electrical energy. Of course, other types of loads may be driven by the high-pressure turbine 30.

The working fluid (i.e., the exhaust from the high-pressure turbine 30) then is directed to the low-pressure turbine 32. Before reaching the low-pressure turbine 32, the downstream combustor 24 adds heat/energy to the working fluid flowing through the recirculation loop 10, as described above. In the embodiment of FIG. 1, the downstream combustor 24 is configured to combust a fuel within the exhaust from the high-pressure turbine 30. In alternative embodiments, as shown in FIGS. 2-6 and discussed in more detail below, the downstream combustor 24 may be configured to combine a flow of compressed oxidant from the oxidant compressor with the flow of exhaust gases from the high-pressure turbine 30 and combust a fuel therein, producing a flow of high-energy, pressurized combustion gases. The working fluid then is directed over the stages of rotating blades within the low-pressure turbine 32, which induces rotation about the shaft 14, thereby transforming the energy of the combustion gases into the mechanical energy of the rotating shaft 14. As with the high-pressure turbine 30, the shaft 14 may couple the low-pressure turbine 32 to the oxidant compressor 11, the recirculation compressor 12, and/or the generator 18. In certain embodiments, the high-pressure turbine 30 and the low-pressure turbine 32 may drive these loads in tandem. In other embodiments, concentric shafts may be used such that the high-pressure turbine 30 drives part of the load on one of the concentric shafts, while the low-pressure turbine 32 drives the remaining load on the other. Additionally, in other system configurations, the high-pressure turbine 30 and the low-pressure turbine 32 may drive separate, non-concentric shafts (not shown).

From the low-pressure turbine 32, recirculation conduit 40 may form a flow path that completes the recirculation loop 10 of the present invention. This flow path, ultimately, delivers the exhaust gases from the turbines 30, 32 to the intake of the recirculation compressor 12. As part of this recirculation conduit 40, the exhaust gases may be used by the heat-recovery steam generator 39. That is, the exhaust gases may provide a heat source for the boiler that drives a steam turbine which receives steam from the heat-recovery steam generator 39. Downstream of that, the exhaust gases may be further cooled by the cooler 44 as well as being passed through a blower 46. The cooler 44 may be used to lower the temperature of the exhaust gases so that they are delivered to the intake of the recirculation compressor 12 within a desired temperature range. The blower 46 may assist in circulating the exhaust gases through the recirculation loop 10. It will be appreciated that the heat recovery steam generator 39, the cooler 44 and the blower 46 may include conventional components and be operated pursuant to conventional methods.

In regard to the operation of the control unit 65, it will be appreciated that it may include an electronic or computer implemented device that takes in data regarding plant operational parameters and conditions, and, pursuant to algorithms, stored data, operator preferences, etc., controls the settings of the various mechanical and electrical systems of the power plant 9 such that desired modes of operation are achieved—for example, achieving operation at or substantially at the stoichiometric point. The control unit 65 may include control logic specifying how the mechanical and electrical systems of the power plant 9 should operate. More specifically, and in accordance with certain embodiments of the present application, the control unit 65 typically includes programmed logic that specifies how certain operating parameters/stored data/operator preferences/etc. should be monitored and, given certain inputs from the monitored data, how the various mechanical and electrical systems of the power plant 9, such as those described above, should be operated. The control unit 65 may control the operation of the various systems and devices automatically in response to the dictates of the control logic, or, in certain instances, may seek operator input before actions are taken. As one of ordinary skill in the art will appreciate, such a system may include multiple sensors, devices, and instruments, some of which are discussed above, that monitor relevant operational parameters. These hardware devices may transmit data and information to the control unit 65, as well as being controlled and manipulated by the control unit 65. That is, pursuant to conventional means and methods, the control unit 65 may receive and/or acquire data from the systems of the power plant 9, process the data, consult stored data, communicate with the operators of the power plant 9, and/or control the various mechanical and electrical devices of the system pursuant to a set of instructions or logic flow diagrams, which, as one of ordinary skill in the art will appreciate, may be made part of a software program that is operated by control unit 65, and which may include aspects relating to embodiments of the present invention. In short, the control unit 65 may control operation of the power plant 9 such that it operates at the stoichiometric point and, while operating thusly, extracts a supply of combustion exhaust that is substantially devoid of oxygen and unspent fuel. Discussion below, in relation to FIG. 7, relates to logic flow diagrams according to the present invention for operating the systems described herein at the stoichiometric point and extraction of desirable exhaust gas. It will be appreciated that these logic flow diagrams may be used by the control unit for such purposes.

FIGS. 2 through 6 provide embodiments of the present invention that include alternative system configurations. It will be appreciated that these configurations present alternative strategies for injecting oxidant from the oxidant compressor 11 into the recirculation loop 10, delivering fuel to the combustion systems, and the manner in which exhaust gases may be extracted. Each of these alternatives offers certain advantages, including the manner in which stoichiometric operation may be achieved and maintained. It will be appreciated that these alternatives are exemplary and not intended to provide an exhaustive description of all possible system configurations which might fall within the scope of the appended claims. In addition, while FIGS. 2 through 6 illustrate both fuel and oxidant being delivered to each of the upstream and the downstream combustor 22, 24, it will be appreciated that certain embodiments described below function in systems in which oxidant is delivered to only one of the upstream and downstream combustors 22, 24 and/or systems in which fuel is delivered to only one of the upstream and downstream combustors 22, 24. Examples of any of these systems may be constructed via control of the various valves 54, 58, 59, 68 that deliver oxidant and fuel to the combustors 22, 24.

Figure 3:
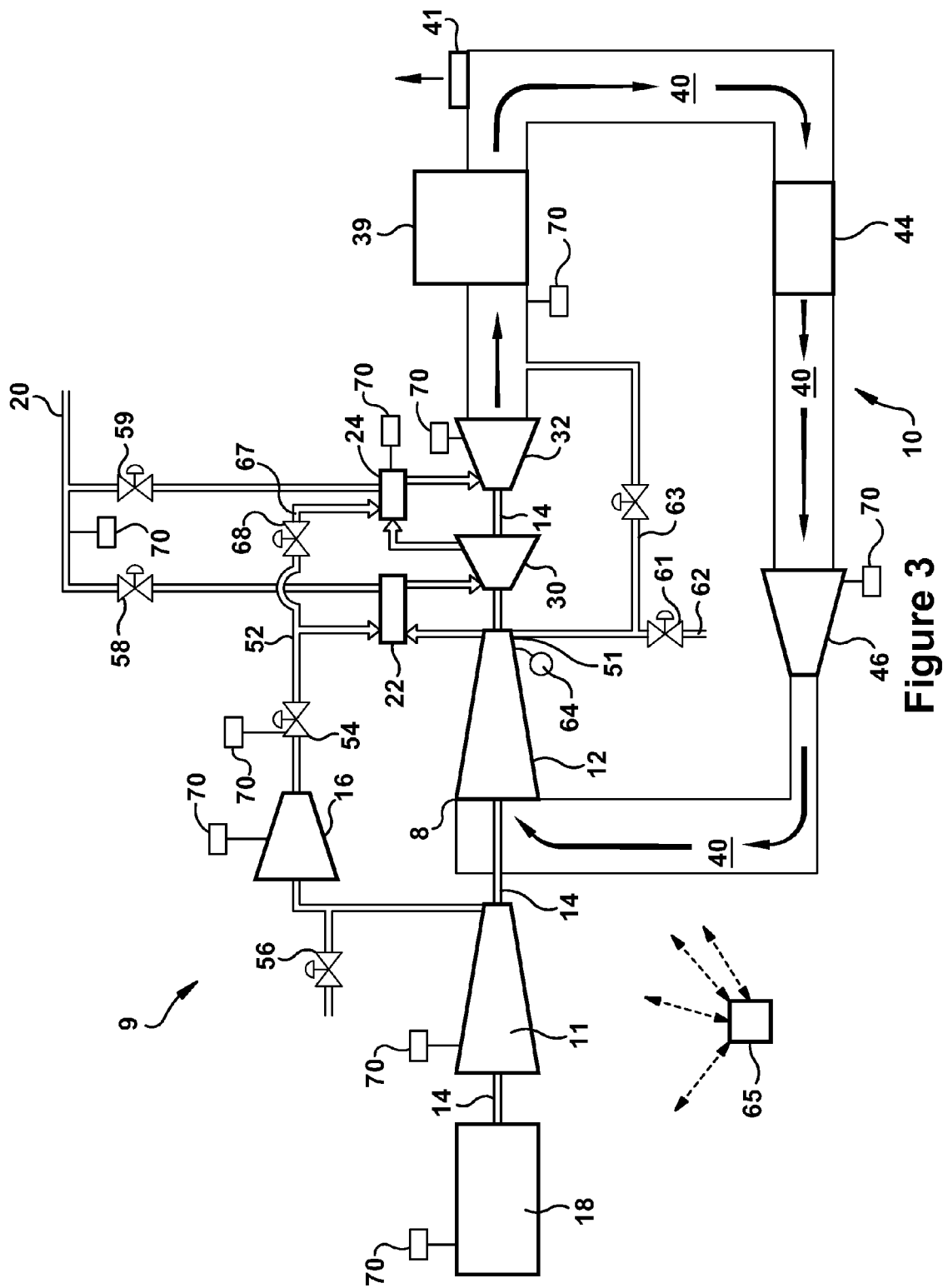
FIG. 3 is a schematic drawing illustrating an alternative configuration of a power plant employing exhaust gas recirculation and a reheat combustion system.
Figure 4:
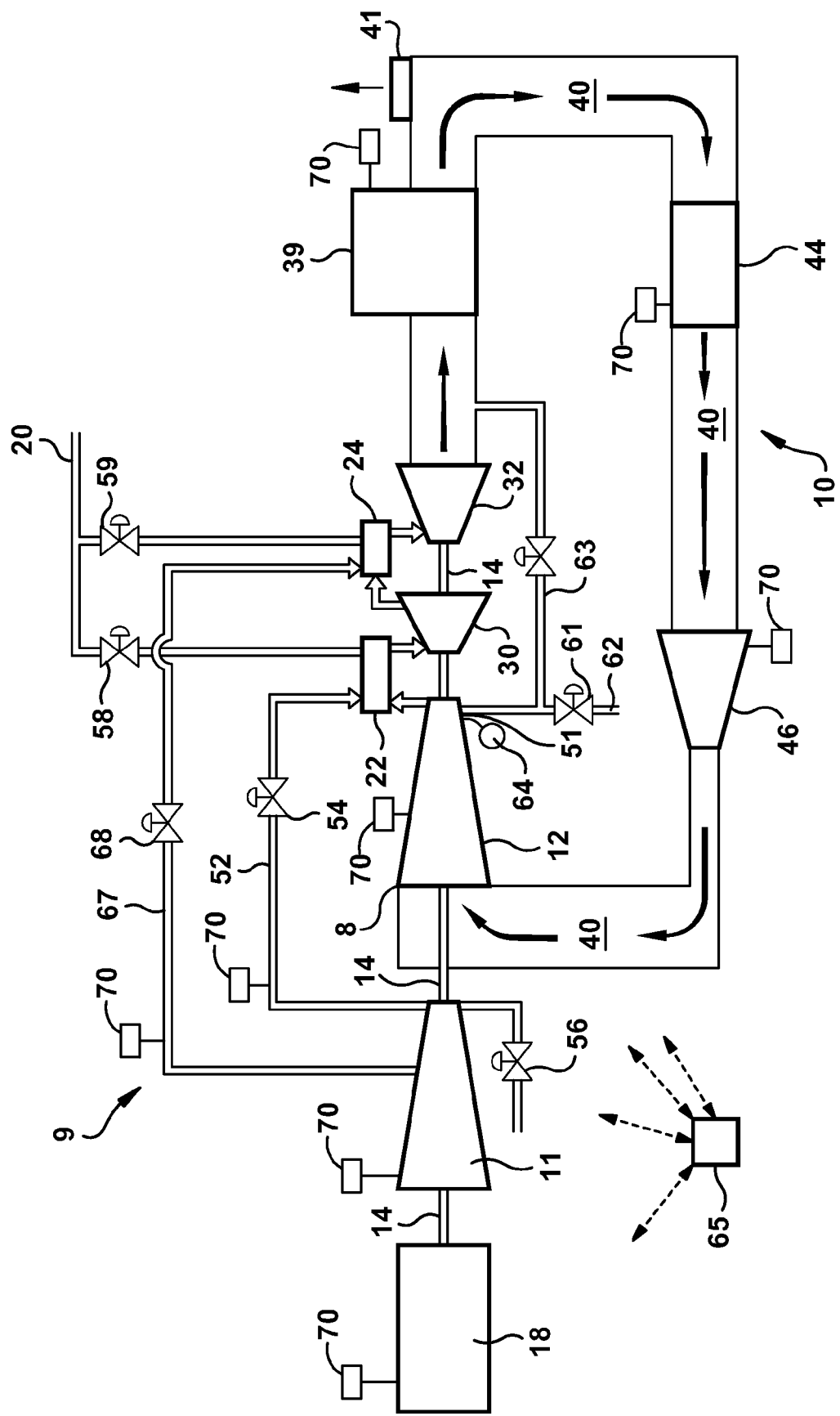
FIG. 4 is a schematic drawing illustrating an alternative configuration of a power plant employing exhaust gas recirculation and a reheat combustion system.

FIG. 2 through 4 provide embodiments that include a second oxidant conduit 67 and oxidant valve 68, which together may be used to supply a controlled compressed oxidant amount (which like the first oxidant conduit 52 is derived from the oxidant compressor 11) to the downstream combustor 24. As shown in FIGS. 2 and 3, the second oxidant conduit 67 may branch from the first oxidant conduit 52, which means that the compressed oxidant for each is drawn from the same supply point from the oxidant compressor 11. In FIG. 2, the branching occurs such that a connection with the first oxidant conduit 52 occurs upstream of the oxidant valve 54 and booster compressor 16 of the first oxidant conduit 52. In this case, the second oxidant conduit 67 thereby bypasses the booster compressor 16. This may be useful in creating flows of differing pressures levels within the first oxidant conduit 52, which would have a higher pressure due to the booster compressor 16 than that within the second oxidant conduit 67. As the first oxidant conduit 52 provides compressed oxidant to a point on the recirculation loop 10 upstream of the second oxidant conduit 67, this configuration allows for an efficient means by which the pressure in each may be controlled to a pressure level that is appropriate for injection at the different locations. In FIG. 3, the branching occurs downstream of the oxidant valve 54 of the first oxidant conduit 52. More specifically, the branching of the second oxidant conduit 52 occurs between the oxidant valve 54 of the first oxidant conduit 52 (which may be positioned downstream of the booster compressor 16, as shown) and combustor 22.

As illustrated in FIG. 4, the second oxidant conduit 67 may also be independent of the first oxidant conduit 52. As shown, in this instance, the second oxidant conduit 67 may extend from an extraction point within the oxidant compressor 11. The extraction point for the second oxidant conduit may be located at one of the stages that is upstream of the position where the first oxidant conduit 52 derives its flow of compressed oxidant, which, for example, may be located in the compressor discharge casing. More specifically, the extraction point may be configured to bleed compressed oxidant at an intermediate stage within the oxidant compressor 11. With the first oxidant conduit 52 drawing from the compressor discharge casing or in proximity thereto, this arrangement results in a higher pressure flow of compressed oxidant through the first oxidant conduit 52 than that in the second oxidant conduit 67. It again will be appreciated that this configuration allows the first and second oxidant conduits 52, 67 to have differing pressure levels without the need of including a booster compressor 16. As before, the pressure differential may be useful in that the pressure of the compressed oxidant may be matched to the pressure at the position on the recirculation loop 10 it is used.

Figure 5:
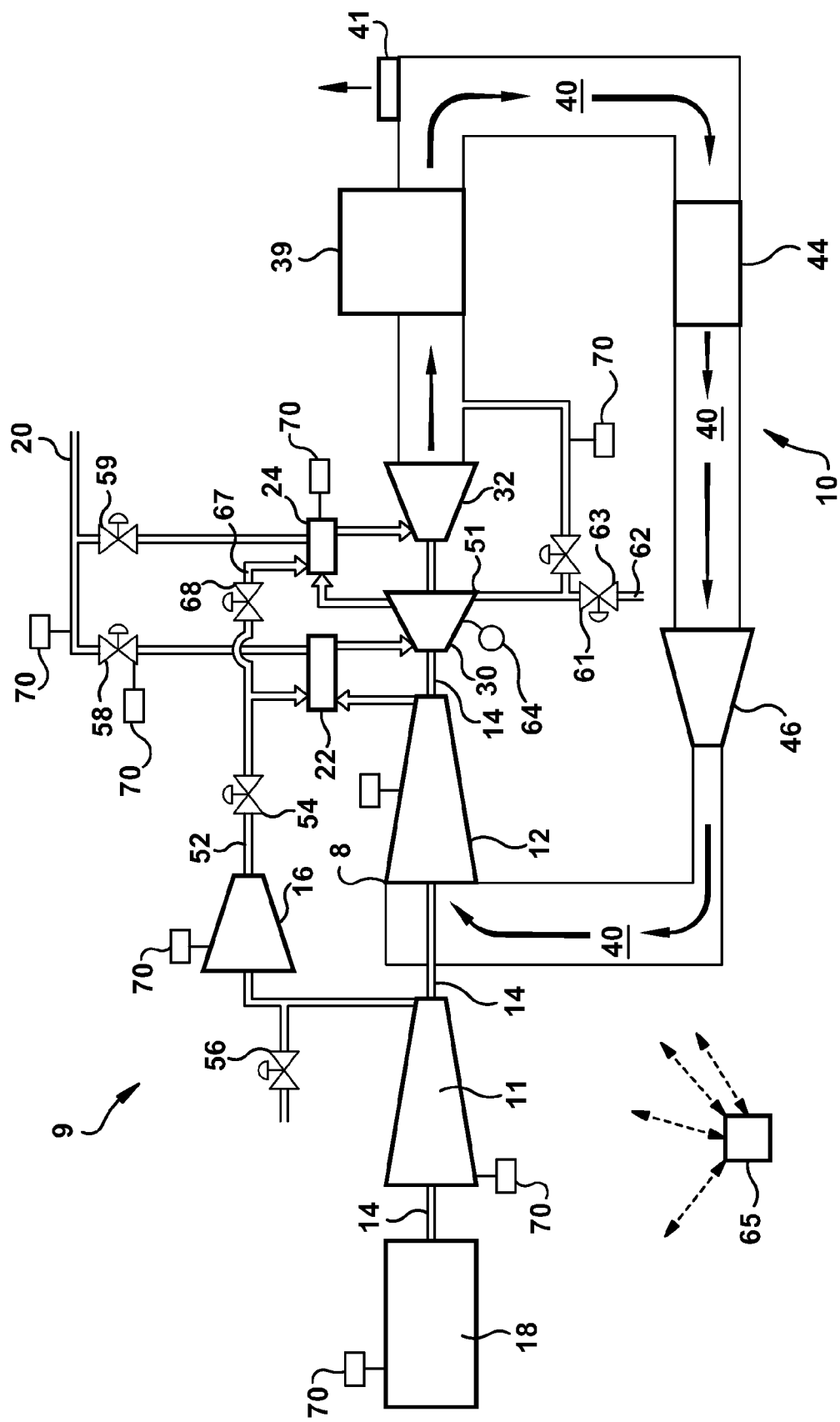
FIG. 5 is a schematic drawing illustrating an alternative configuration of a power plant employing exhaust gas recirculation and a reheat combustion system.
Figure 6:
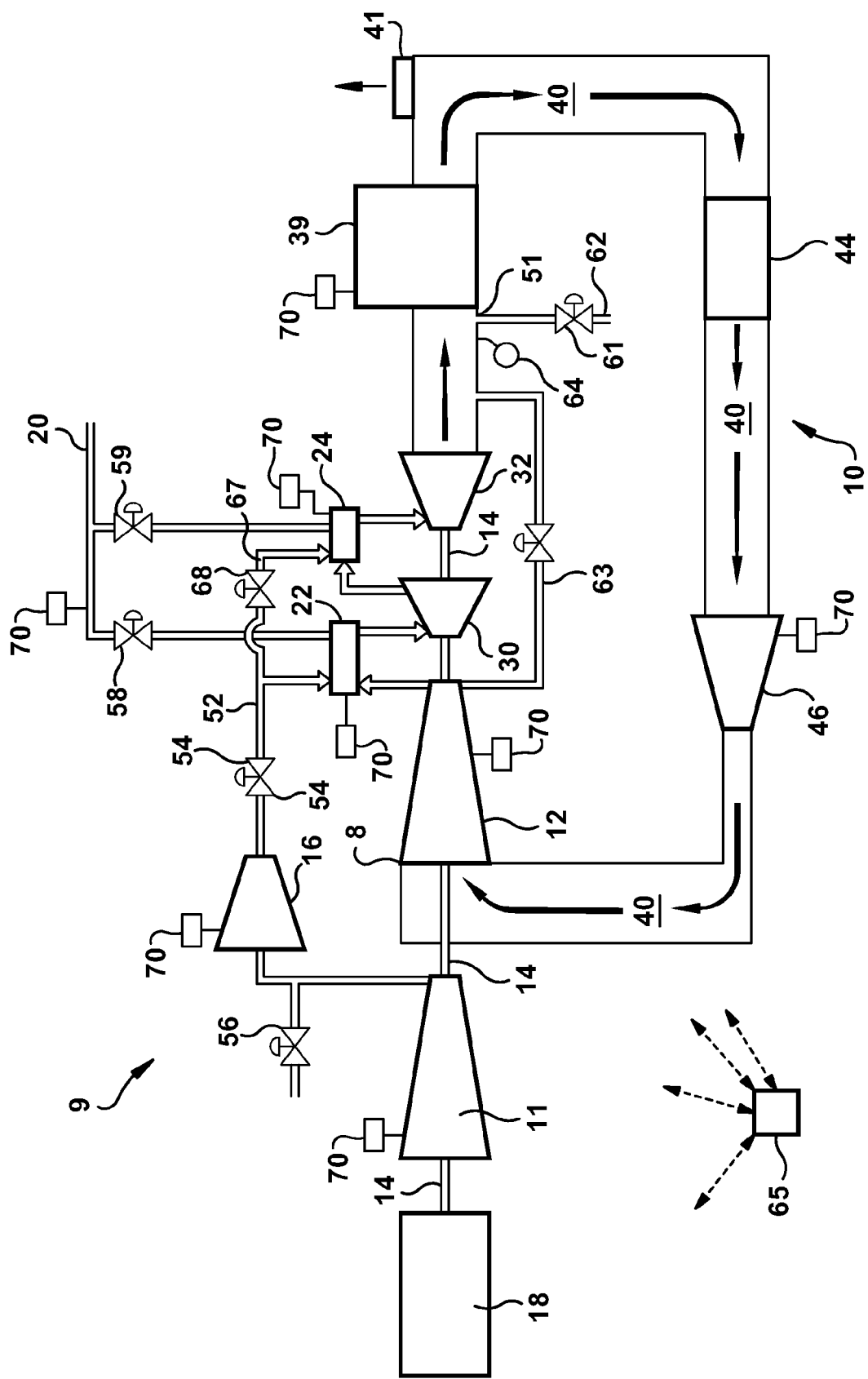
FIG. 6 is a schematic drawing illustrating an alternative configuration of a power plant employing exhaust gas recirculation and a reheat combustion system.

FIGS. 5 and 6 provide differing strategies for locating the extraction point 51 given the fact that both combustors 22, 24 receive a supply of compressed oxidant from the oxidant compressor 11. It will be appreciated that configuring the system to have two points at which oxidant/fuel are combusted provides new alternatives for producing operation at the stoichiometric point (note that, as stated, this refers to operation within a desired range about or near the stoichiometric point), and, thus, differing locations (as provided in FIGS. 5 and 6) at which working fluid may be extracted. As described, the architecture and control methods provided herein teach efficient and effective means by which power plants may be operated at the stoichiometric point. The fuel and oxidant supply to the power plant 9 may be controlled in such way that, once the oxygen (from the injected oxidant) and fuel have adequately mixed, ignited and combusted, an exhaust that is substantially free of oxygen and unspent fuel is produced. As a result of this, pursuant to embodiments of the present invention, the extraction point 51 may be located at any point on the recirculation loop 10 that has exhaust derived from stoichiometric point operation. As described above in relation to the configuration of FIG. 1, this generally means that the extraction point may be located at any position on the recirculation loop 10 that is both: 1) downstream of the combustor 22, 24 which is being operated at the stoichiometric point; and 2) upstream of the other combustor 22, 24. It will be appreciated that more than one extraction point within this range may be provided, and that this arrangement may be useful where different pressure levels are useful for a plurality of extracted gas supplies.

FIG. 5 illustrates an exemplary configuration having an extraction point 51 that is positioned near the aft end of the high-pressure turbine 30. It will be appreciated that this extraction point 51 may prove effective when the upstream combustor 22 operates at the stoichiometric point. Given the principles discussed above and assuming this operation, possible extraction points 51 constitute a range defined between the upstream combustor 22 and, proceeding in the downstream direction, the downstream combustor 24. That is, pursuant to embodiments of the present invention, the power plant 9 may be controlled such that the combined effect of the oxidant and fuel introduced within the combustors 22, 24 produces combustion within the upstream combustor 22 at a preferred stoichiometric ratio, which thereby creates a range of positions downstream of the upstream combustor 22 in which extraction of working fluid having desired characteristics may be achieved.

FIG. 6 illustrates an exemplary configuration having an extraction point 51 that is positioned just upstream of the heat recovery steam generator 39. It will be appreciated that this extraction point 51 may prove effective when the downstream combustor 24 operates at the stoichiometric point. Given the principles discussed above and assuming this operation, possible extraction points 51 constitute a range defined between the downstream combustor 24 and, proceeding in the downstream direction, the upstream combustor 22. That is, pursuant to embodiments of the present invention, the power plant 9 may be controlled such that the combined effect of the oxidant and fuel introduced within the combustors 22, 24 produces combustion within the downstream combustor 24 at a preferred stoichiometric ratio, which thereby creates a range of positions downstream of the downstream combustor 24 in which extraction of the working fluid having desired characteristics may be achieved.

Figure 7:
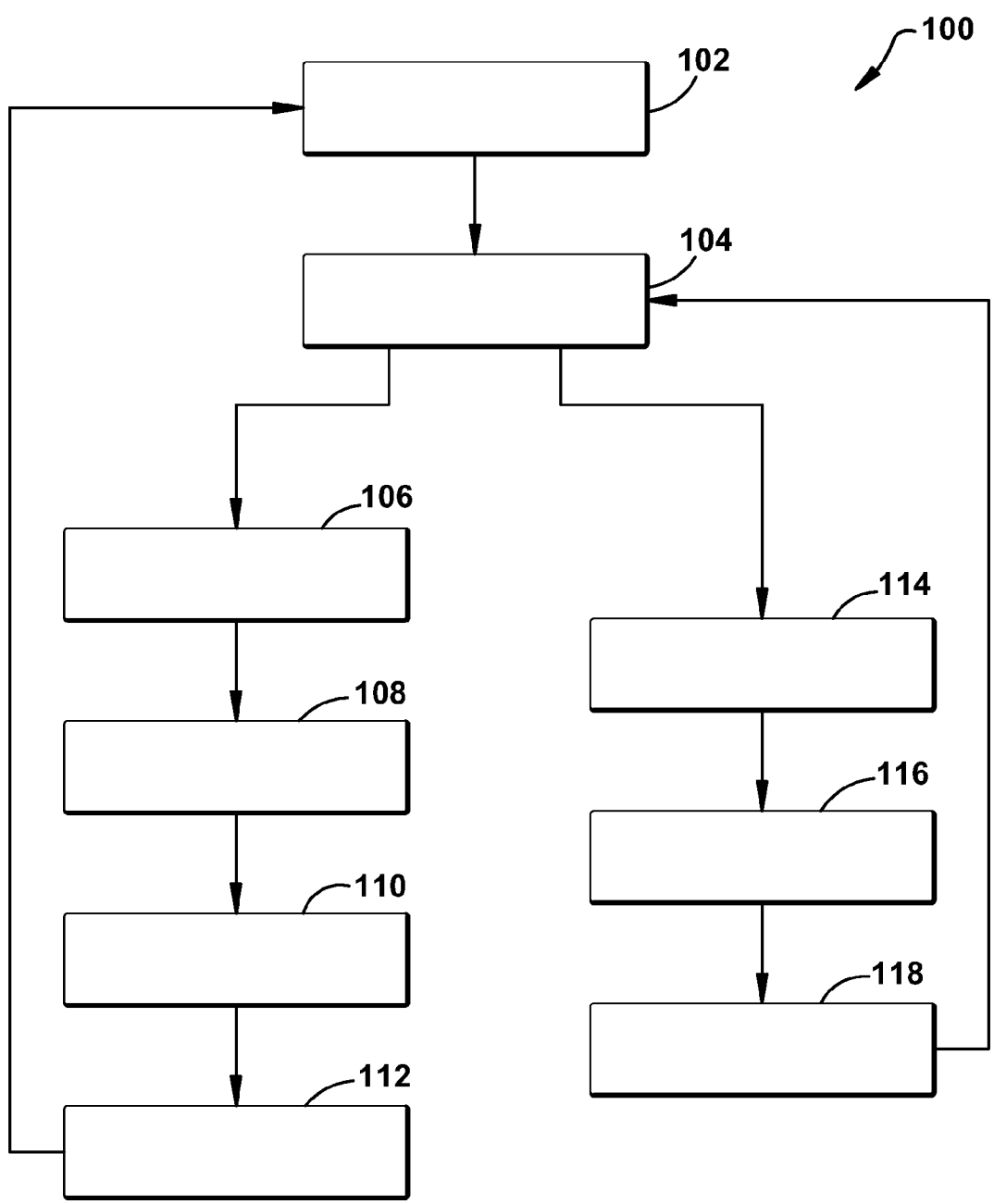
FIG. 7 is a flow diagram illustrating an exemplary method of operation relating to a power plant employing exhaust gas recirculation and a reheat combustion system.

FIG. 7 illustrates a logic flow diagram 100 for a method of operating the power plant 9 according to an exemplary embodiment of the present invention. As one of ordinary skill in the art will appreciate, the logic flow diagram 100 is exemplary and includes steps which may not be included in the appended claims. Further, any function described above in relationship to the several components of the system is incorporated into the discussion below where necessary or possible to aid in the carrying out of the specified steps. The logic flow diagram 100 may be implemented and performed by the control unit 65. In some embodiments, the control unit 65 may comprise any appropriate high-powered solid-state switching device. The control unit 65 may be a computer; however, this is merely exemplary of an appropriate high-powered control system, which is within the scope of the present application. In certain embodiments, the control unit 65 may be implemented as a single special purpose integrated circuit, such as ASIC, having a main or central processor section for overall, system-level control, and separate sections dedicated to performing various different specific combinations, functions and other processes under control of the central processor section. It will be appreciated by those skilled in the art that the control unit also may be implemented using a variety of separate dedicated or programmable integrated or other electronic circuits or devices, such as hard-wired electronic or logic circuits including discrete element circuits or programmable logic devices. The control unit 65 also may be implemented using a suitably programmed general-purpose computer, such as a microprocessor or micro-controller, or other processor device, such as a CPU or MPU, either alone or in conjunction with one or more peripheral data and signal processing devices. In general, any device or similar devices on which a finite state machine capable of implementing the logic flow diagram 100 may be used as the control unit 65.

It will be appreciated that, in one possible environment, the control unit 65 may include a General Electric SPEEDTRONIC™ Gas Turbine Control System, such as is described in Rowen, W. I., "SPEEDTRONIC™ Mark V Gas Turbine Control System", GE-3658D, published by GE Industrial & Power Systems of Schenectady, N.Y. The control unit 65 may be a computer system having a processor(s) that executes programs to control the operation of the gas turbine using sensor inputs and instructions from human operators. The programs executed by the control unit 65 may include scheduling algorithms for regulating the components of the power plant 9. The commands generated by the control unit 65 may cause actuators within any of the components to, for example, adjust valves between the fuel supply and combustors 22, 24 that regulate the flow and type of fuel, inlet guide vanes on the compressors 11, 12, and other control settings on the turbine 30, 32. Further, the control unit 65 may regulate the power plant 9 based, in part, on algorithms stored in computer memory of the control unit 65. These algorithms, for example, may enable the control unit 65 to maintain emission levels in exhaust to within certain predefined limits, to maintain the combustor firing temperature to within predefined temperature limits, or another maintain operational parameter within a predefined range.

Returning to FIG. 7, one of ordinary skill in the art will appreciate that, in general, flow diagram 100 illustrates an example of how a feedback loop may be structured to provide an iterative process for controlling stoichiometry within one of the combustors and/or extraction level of exhaust having desired characteristics. It will be appreciated that the several steps of such a process may be described in many different ways without deviating from the central idea of the process set forth herein. The control methods described herein may be implemented via a feedback loop that is used in conjunction with control algorithms, such as a PID control algorithm, though other control algorithms also may be used.

Logic flow diagram 100 may begin at a step 102, which includes monitoring and measuring the operating conditions and process variables (which will be referred to generally as "process variables") of the power plant 9. Process variables, as used herein, represent the current status of the system or process that is being controlled. In this case, process variables may include any operating parameter that may be measured by any type of sensor. More specifically, at step 102, the control unit 65, pursuant to any of the methods discussed above or any conventional systems (either current or developed in the future), may receive, monitor, and record data relating to the operation of the power plant 9. The operation of the power plant 9 and the several components related thereto may be monitored by several sensors 70 detecting various conditions of the system and environment. For example, one or more of the following process variable may be monitored by the sensors 70: temperature sensors may monitor ambient temperature surrounding the plant 9, inlet and discharge temperatures of the compressors 11, 12, exhaust temperature and other temperature measurements along the hot-gas path of the turbines 30, 32, pressure sensors may monitor ambient pressure, and static and dynamic pressure levels at the inlet and outlet of the compressors 11, 12, and exhaust of the turbines 30, 32, as well as at other locations in the gas stream. Sensors 70 further may measure the extraction level at the extraction point 51, fuel flow to each of the combustors 22, 24, gas composition within the recirculated exhaust gas or working fluid (which may include sensor for detecting excess oxidant 64 as well as other sensors that measure levels of unspent fuel or CO or other gases within the exhaust gas), temperature and pressure of the recirculated exhaust gas along the recirculation conduit 10, including parameters relating to the operation of the heat recovery steam generator 39, the cooler 44, and the blower 46. The sensors 70 may also comprise flow sensors, speed sensors, flame detector sensors, valve position sensors, guide vane angle sensors, and the like that sense various parameters pertinent to the operation of power plant 9, which may include oxidant flow characteristics through the first oxidant conduit 52 and the second oxidant conduit 67. It will be appreciated that the system may further store and monitor certain "specified set-points" that include operator preferences relating to preferred or efficient modes of operation. It further will be appreciated that the measuring, monitoring, storing and/or recording of process variables and/or specified set-point may occur continuously or at regular intervals, and that updated or current data may be used throughout any of the several steps of logic flow diagram 100 whether or not there is a direct line in FIG. 7 connecting step 102 to the other steps. From step 102, the process may continue to step 104.

At a step 104, the method may determine whether whichever combustor 22, 24 is configured to operate at a preferred stoichiometric ratio (which may include a range of suitable stoichiometric ratios) is, in fact, operating at the preferred stoichiometric ratio. It will be appreciated that this may be accomplished by comparing measured process variables, calculating current conditions, and comparing current conditions to specified set-points. If it is determined that this mode of operation is occurring, the method may proceed to step 106. If it is determined that this mode of operation is not occurring, the method may proceed to step 114.

It will be appreciated that the determination as to whether the relevant combustor 22, 24 is operating at the preferred stoichiometric ratio may be achieved in several ways and that, once determined, a feedback loop using one or more control inputs may be used to control the system within this preferred mode or cause the system to operate in this manner. One method may be to detect or measure the content of the exhaust gases being emitted from the relevant combustor. This may include sensors 70, such as the sensor for detecting excess oxidant 64, that measures the gases present in the exhaust and/or other relevant characteristics. It will be appreciated that a sensor 70 that detects the presence of unspent fuel or CO or other gases within the exhaust flow may be used also. Measuring the flow characteristics of the inputs (i.e., the oxidant and the fuel) to one of the combustors also may be used to determine if combustion within the relevant combustor is occurring at the preferred stoichiometric ratio. In this case, for example, the oxidant flow into the combustor may be measured, the fuel flow into the combustor may be measured, and a determination made as to the stoichiometric characteristics of the combustion therein given these inputs. Other relevant operating characteristics (such as temperature, pressure, etc.) may also be taken into account. Alternatively, or in conjunction with this calculation, unspent fuel or CO or other gases and/or oxygen may be measured downstream of the combustors or other points within the circulating flow of working fluid. From this, a calculation may be made as to the stoichiometric balance of the combustion, which may then be compared with the specified set-point or preferred stoichiometric ratio to determine if it falls within an acceptable range.

At step 106, having already determined that one of the combustors is operating within the desired stoichiometric range, the logic flow diagram 100 may determine the current level of extraction at extraction point 51. This may be done via checking measured process variables which either indicate this flow level directly or may be used to calculate the amount of gas being extracted. The method may further check whether the current level of extraction satisfies a desired level of extraction or specified set-point. This may be done by comparing the actual level of extraction (which may be measured) to operator defined set-points or preference. If it is determined that the desired level of extraction is being satisfied, the method may cycle back to step 102 where the process begins anew. If it is determined that the desired level of extraction is not being satisfied, the method may proceed to step 108.

At step 108, the method determines one or more "control inputs" that may be used to manipulate the function of system components in such a way as to achieve the desired level of extraction or, at least, to achieve an extraction level that decreases the difference between the actual level of extraction and the desired level of extraction. It will be appreciated that a "control input" is one of the many ways by which operation of the power plant 9 or any of its components may be controlled or manipulated. These, for example, may include level of fuel flow to the combustors 22, 24, control of oxidant flow to the combustors 22, 24, angle of inlet guide vanes within the compressors 11, 12, etc. Whereas, a "variance amount" is the extent to which a control input must be manipulated to bring about the desired manner of operation. The variance amount, for example, may include the extent to which the fuel flow to the combustors 11, 12 must be increased or decreased to bring about desired operation. In certain embodiments, one of the control inputs that is particularly relevant at step 108 is the setting of the extracted gas valve 61. In this case, the variance amount is the extent to which the setting of the valve 61 needs to be manipulated so that a desired extraction level is achieved. The method may then proceed to step 110. It will be appreciated that a conventional feedback control mechanism in conjunction with a PID controller or the like may be used to achieve control as specified herein. Thus, an iterative process of variations to one or more control inputs may bring the system toward desired operation.

At step 110, in some embodiments, the method may determine the probable effects to plant operation of each of the available control inputs/variance amounts from step 108 before making the actual change to the control input. It will be appreciated that these types of calculations may be achieved per conventional power plant control programs and modeling software, such as those systems and methods mention herein and others similar to them. It further will be appreciated that these calculations may involve an iterative process that takes into account efficient control measures/counter-measures which may be made in response to the proposed variance of the relevant control input, economic considerations, wear and tear to the power plant, operator preferences, plant operational boundaries, etc. The method then may proceed to Step 112.

At step 112, the process 100 may determine which of the available control inputs/variance amounts from the above step is most favorable or preferred. This determination, in large part, may be based upon the effects to system operation that were calculated in step 110. Then, for whichever control input/variance amount is deemed most favorable, the method may determine if the proposed control input/variance amount should be executed based on whether the associated benefits of meeting extraction demand outweighs the costs associated with executing the variance amount. It will be appreciated that economic considerations and operator preferences may be included in this determination. Based on this calculation, the method then may execute the proposed control input/variance amount or not. The method then may return to step 102, and an iterative process begun by which a preferred level of extraction is achieved.

As described above, if at step 104 it is determined that the relevant combustor is not operating at the stoichiometric point, the method may proceed to step 114. At step 114, the method may determine one or more control inputs/variance amounts that are available for achieving stoichiometric point operation within the relevant combustor. As before, control inputs include ways in which operation of the power plant 9 may be altered, manipulated or controlled, and the variance amount is the extent to which a control input must be manipulated to achieve a desired mode of operation. The method may then proceed to step 116.

At step 116, the method may determine the probable effects to plant operation of each of the available control inputs/variance amounts from step 114. It will be appreciated that these types of calculations may be achieved per conventional power plant control programs and modeling software, such as those systems and methods mention herein and others similar to them. It further will be appreciated that these calculations may involve an iterative process that takes into account efficient control measures/counter-measures which may be made in response to the proposed variance of the relevant control input, economic considerations, wear and tear to the power plant, operator preferences, plant operational boundaries, etc. The method then may proceed to Step 118.

Plant operation boundaries may include any prescribed limit that must be followed so that efficient operation is achieved and/or undue wear and tear or more serious damage to systems is avoided. For example, operational boundaries may include maximum allowable temperatures within the turbines 30, 32 or combustor components. It will be appreciated that exceeding these temperatures may cause damage to turbine components or cause increased emissions levels.

Another operational boundary includes a maximum compressor pressure ratio across each of the oxidant compressor 11 and the recirculation compressor 12. Exceeding this limitation may cause the unit to surge, which may cause extensive damage to components. Further, the turbine may have a maximum mach number, which indicates the maximum flow rate of the combusted gases at the exit of the turbine. Exceeding this maximum flow rate may damage turbine components. Given the possible configuration of combustors within the power plant 9, relative pressures of the flows delivered at the combustors 22, 24 by each of the compressors 11, 12 may be another operational boundary. That is, depending on the configuration of the combustor 22, 24 and the manner in which flows are combined, the pressure of the compressed oxidant delivered by the oxidant compressor 11 must be within a certain range of that supplied by recirculation compressor 12 to avoid aerodynamic losses, backflow, and other potential issues.

At step 118, the method may determine which of the available control inputs/variance amounts from the above step is most favorable or preferred. This determination, in large part, may be based upon the effects to system operation that were calculated in step 116 as well as the extent to which the control input/variance amount is able to manipulate the power plant system toward the intended mode of operation. Then, for whichever control input/variance amount is deemed most favorable, the method may determine if the proposed control input/variance amount should be executed based on whether the associated benefits of achieving stoichiometric point operation (which may include the benefits of being able to extract working fluid) outweighs the costs associated with executing the variance amount. It will be appreciated that economic considerations and operator preferences may be included in this determination. Based on this calculation, the method then may execute the proposed control input/variance amount or not. The method then may return to step 104, and an iterative process by which stoichiometric point operation within one of the combustors is ultimately achieved or determined not possible due to some operational constraint.

It will be appreciated that there are many possible control inputs/variance amounts that affect the stoichiometric ratio in the combustors 22, 24. In preferred embodiments, one such control input includes controllably varying the compressed oxidant amount delivered to the combustors 22, 24. It will be appreciated that controllably varying the supply of compressed oxidant may have a significant effect on the stoichiometry ratio within the combustors 22, 24. For example, if sensors indicate that, given the supply of fuel to a combustor, more compressed oxidant (i.e., more oxygen) is needed to achieve stoichiometric combustion, the supply of compressed oxidant may be increased by manipulating inlet guide vanes of the oxidant compressor 11 and/or changing valve settings on the oxidant valves 54, 68 so that more compressed oxidant is able to pass through the oxidant conduit 52, 67 associated with the combustor. On the other hand, varying fuel supply is another control input that may be used to achieve operation at a preferred stoichiometric ratio. In this case, for example, sensors 70 may indicate that, given the compressed oxidant amount being delivered to the combustor, more fuel is needed to achieve stoichiometric point operation. The fuel amount being delivered to the one or both combustors 22, 24 may be increased by manipulating one or both of the fuel valves 58, 59. Further, it will be appreciated that stoichiometric point combustion may be controlled in one of the combustors by changing settings that are directly related to the other combustor. This is because changed settings within one combustor may create excess oxidant or unspent fuel in the recirculation loop 10 that is ultimately ingested within the other combustor, thereby affecting the combustion stoichiometric ratio therein.

In one exemplary mode of control, the fuel/oxidant input into the power plant 9 may be set such that there is excess oxidant (i.e., a stoichiometric ratio greater than 1) in whichever of the combustors 22, 24 is meant to operate at the stoichiometric point. Then, the control process may decrease the excess oxidant by small increments within the relevant combustor 22, 24 (either by increasing fuel flow to the combustor or by decreasing the oxidant supply) while monitoring the stoichiometric ratio therein by measuring a relevant process variable. In certain embodiments, this may continue until the stoichiometric ratio is within a preferred range, while still being slightly above 1 (i.e., still having excess oxidant). This may be implemented by slowly increasing oxidant flow, decreasing fuel flow, or both to the particularly combustor 22, 24, while monitoring stoichiometric conditions therein. It may also be done indirectly by slowly increasing oxidant flow, decreasing fuel flow, or both to the other combustor 22, 24 so that excess fuel or oxidant becomes part of the working fluid and ingested into the relevant combustor.

Figure 8:
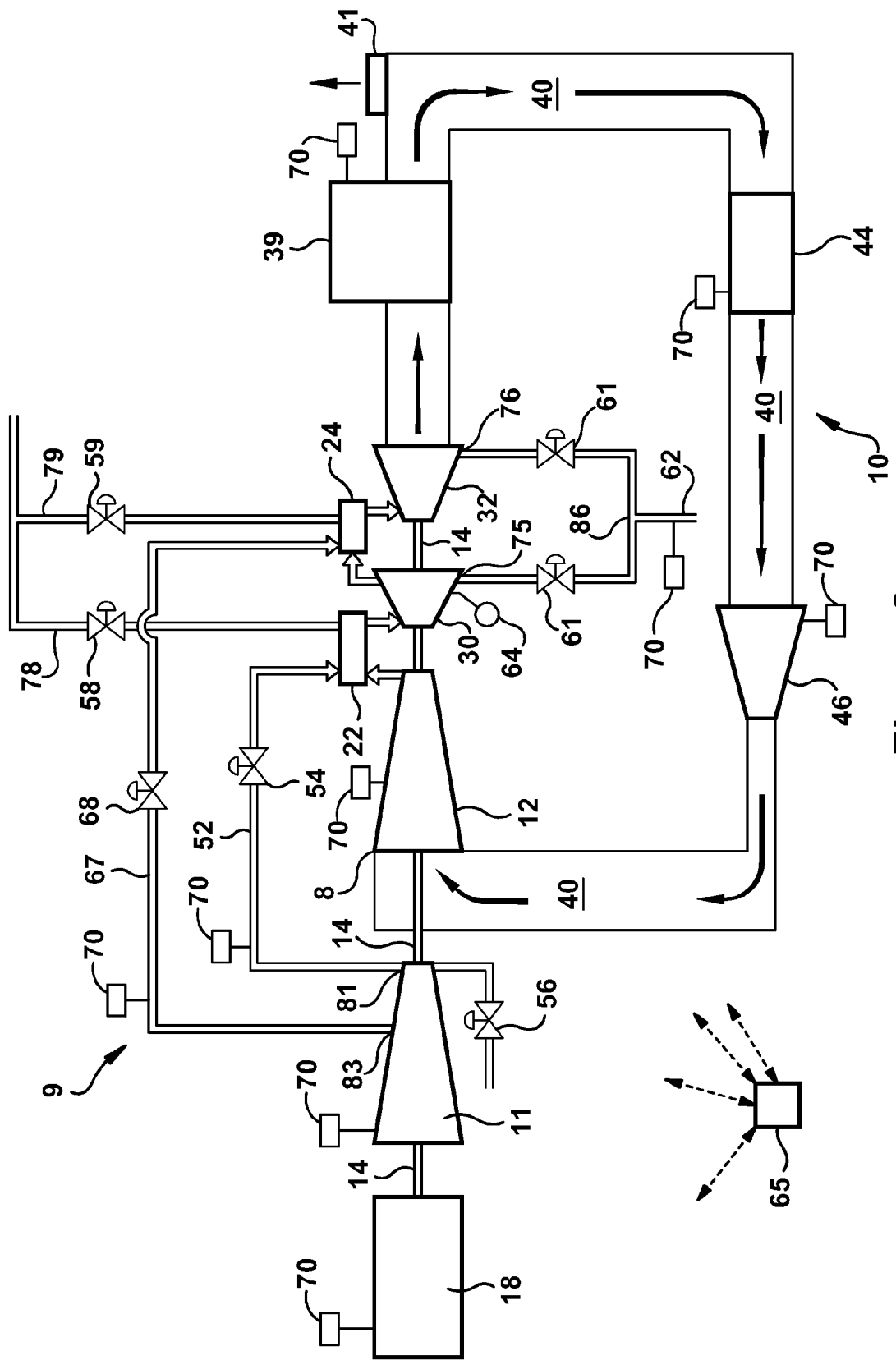
FIG. 8 is a schematic drawing illustrating an alternative configuration of a power plant employing exhaust gas recirculation and a reheat combustion system.
Figure 9:
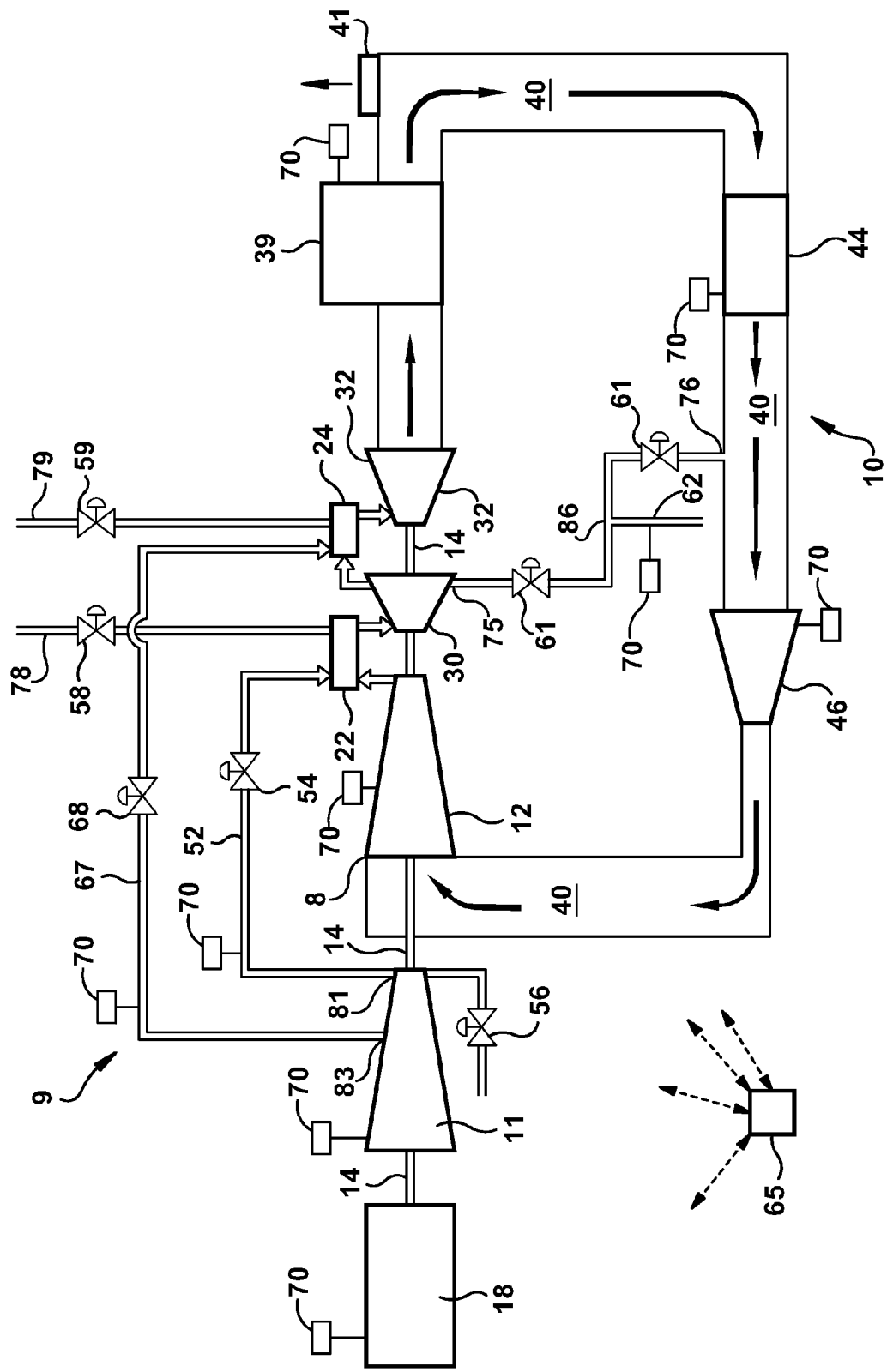
FIG. 9 is a schematic drawing illustrating an alternative configuration of a power plant employing exhaust gas recirculation and a reheat combustion system.

FIGS. 8 and 9 provide schematic illustrations of alternative configurations of exemplary power plants according to the present application. As shown, these power plants also employ exhaust gas recirculation and a reheat combustion system similar to those described above. However, the power plants of FIGS. 8 and 9 provide dual extraction locations on the recirculation loop. It will be appreciated that while the description of components, system configurations, and control methods provided above are applicable to the power plants of FIGS. 8 and 9 (as well as some of the functionality described below being applicable to the components, system configuration, and control methods described above), the dual extraction locations provide a novel application that enables enhanced functionality, which may beneficially employed in certain operating conditions. As before, the power plant 9 may include a recirculation loop 10 about which a working fluid is recirculated. The recirculation loop 10 may include a plurality of components that are configured to accept an outflow of working fluid from a neighboring upstream component and provide an inflow of working fluid to a neighboring downstream component. The components of the recirculation loop 10 may include: a recirculation compressor 12; an upstream combustor 22 positioned downstream of the recirculation compressor 12; a high-pressure turbine 30 positioned downstream of the upstream combustor 22; a downstream combustor 24 positioned downstream of the high-pressure turbine 30; a low-pressure turbine 32 positioned downstream of the downstream combustor 24; and recirculation conduit 40 configured to complete the loop by directing the outflow of working fluid from the low-pressure turbine 32 to the recirculation compressor 12. As described in more detail above in relation to the other exemplary power plants 9 provided in the several figures, the power plant 9 of FIGS. 8 and 9 may further include systems and components that control and deliver a compressed oxidant amount to each of the upstream combustor and the downstream combustor. As described above in relation to the other exemplary power plants 9, the power plant 9 of FIGS. 8 and 9 may further include systems and components that control a fuel amount supplied to each of the upstream combustor 22 and the downstream combustor 24. The power plant 9, as illustrated, may further include systems and components that extract the working fluid exhausted from the upstream combustor 22 from a first extraction point 75, and systems and components that extract the working fluid exhausted from the downstream combustor 24 from a second extraction point 76. The power plant 9, as illustrated in FIGS. 8 and 9 and discussed further above, may include systems and components for controlling operation such that each of the upstream combustor 22 and the downstream combustor 24 periodically operate at a preferred stoichiometric ratio, as well as means for selectively extracting working fluid from the first extraction point 75 and the second extraction point 76 based on which of the upstream combustor 22 and the downstream combustor 24 operates at the preferred stoichiometric ratio.

In certain embodiments, the first extraction point 75 may include a first controllable extracted gas valve 61 for controlling the amount of gas extracted at that location. The first extraction point 75 may be disposed on the recirculation loop 10 between the upstream combustor 22 and, proceeding in a downstream direction, the downstream combustor 24. As illustrated in FIGS. 8 and 9, one exemplary location for the first extraction point 75 is the aft end of the high-pressure turbine 30. The first controllable extracted gas valve 61 may be controllable to at least two settings: a closed setting that prevents the extraction of working fluid and an open setting that allows the extraction of working fluid. Similarly, the second extraction point 76 may include a second controllable extracted gas valve 61 for controlling the amount of gas extracted at that location. The second extraction point 76 may be disposed on the recirculation loop 10 between the downstream combustor 24 and, proceeding in a downstream direction, the upstream combustor 22. As illustrated in FIG. 8, one exemplary location for the second extraction point 76 is the aft end of the low-pressure turbine 32. As illustrated in FIG. 9, another exemplary location for the second extraction point 76 is on the recirculation conduit 40 between the cooler 44 and the blower 46. Depending on the required properties of the extracted gas, other locations are possible. The second controllable extracted gas valve 61 may be controllable to at least two settings: a closed setting that prevents the extraction of working fluid and an open setting that allows the extraction of working fluid.

In certain embodiments, the systems and components for controlling the compressed oxidant amount supplied to the upstream combustor 22 may include an oxidant compressor 11, a first oxidant conduit 52 that is configured to direct compressed oxidant derived from the oxidant compressor 11 to the upstream combustor 22, and a first controllable oxidant valve 54 disposed on the first oxidant conduit 52 that is controllable to at least three settings: a closed setting that prevents delivery of the compressed oxidant to the upstream combustor 22 and two open settings that allow delivery of differing compressed oxidant amounts to the upstream combustor 22. In certain embodiments, the systems and components for controlling the compressed oxidant amount supplied to the downstream combustor 24 may include the oxidant compressor 11, a second oxidant conduit 67 that is configured to direct compressed oxidant derived from the oxidant compressor 11 to the downstream combustor 24, and a second controllable oxidant valve 68 disposed on the second oxidant conduit 67 that is controllable to at least three settings: a closed setting that prevents delivery of the compressed oxidant to the downstream combustor 24 and two open settings that allow delivery of differing compressed oxidant amounts to the downstream combustor 24. In certain embodiments, a booster compressor 16 may be included that is disposed on at least one of the first oxidant conduit 52 and the second oxidant conduit 67 (an example of which is shown in FIG. 6). The booster compressor 16 may be configured to boost the pressure of the compressed oxidant flowing through at least one of the first 52 and the second oxidant conduit 67 such that the compressed oxidant amount supplied to at least one of the upstream 22 and the downstream combustor 24 comprises a pressure level that corresponds to a preferable injection pressure of whichever of the upstream 22 and downstream combustor 24. In certain embodiments, at an upstream end, the first oxidant conduit 52 may include a first oxidant extraction location 81 at which the compressed oxidant is extracted from the oxidant compressor 11. At an upstream end, the second oxidant conduit 67 may include a second oxidant extraction location 83 at which the compressed oxidant is extracted from the oxidant compressor 11. Within the oxidant compressor 11, the first oxidant extraction location 81 may include a downstream position relative to the second oxidant extraction location 83. The first oxidant extraction location 81 may include a predetermined position within the oxidant compressor 11 that corresponds to a preferable injection pressure at the upstream combustor 22. The second extraction location 83 may include a predetermined position within the oxidant compressor 11 that corresponds to a preferable injection pressure at the downstream combustor 24.

In certain embodiments, the systems and components for controlling the fuel amount supplied to the upstream combustor 22 may include an upstream combustor fuel supply 78 that may include a controllable upstream combustor fuel valve or first controllable fuel valve 58. The first controllable fuel valve 58 may be controllable to at least three settings: a closed setting that prevents delivery of fuel to the upstream combustor 22 and two open settings that allow delivery of differing fuel amounts to the upstream combustor 22. The systems and components for controlling the fuel amount supplied to the downstream combustor 24 may include a downstream combustor fuel supply 79 that may include a controllable downstream combustor fuel valve or second controllable fuel valve 59. The second controllable fuel valve 59 may be controllable to at least three settings: a closed setting that prevents delivery of fuel to the downstream combustor 24 and two open settings that allow delivery of differing fuel amounts to the downstream combustor 24. In certain embodiments, as shown in FIG. 8, the upstream combustor fuel supply 78 and the downstream combustor fuel supply 79 may have a common source and, thus, a common fuel type. In other embodiments, as shown in FIG. 9, the upstream combustor fuel supply 78 and the downstream combustor fuel supply 79 may have difference sources and may supply differing fuel types.

As describe above in more detail, the power plant 9 of FIGS. 8 and 9 may include systems and components for controlling the power plant 9 such that each of the upstream combustor 22 and the downstream combustor 24 periodically operate at the preferred stoichiometric ratio. In certain embodiments includes a computerized control unit 65 that is configured to control the settings of the first and second controllable oxidant valves 54 and the first and second controllable fuel valves 58, 59.

As described in more detail above, in certain embodiments, the power plant 9 of FIGS. 8 and 9 may include systems and components for determining a current stoichiometric ratio at which the upstream combustor 22 and the downstream combustor 24 operate. In certain exemplary embodiments, the systems and components for determining the current stoichiometric ratio at which the upstream combustor 22 and the downstream combustor 24 operate include: systems and components for measuring the compressed oxidant amount being supplied to the upstream and downstream combustors 22, 24 and systems and components for measuring the fuel amount being supplied to the upstream and downstream combustors 22, 24; and systems and components for calculating the current stoichiometric ratio at which each of the upstream combustor 22 and the downstream combustor 24 operates based on the measured compressed oxidant amounts and the measured fuel amount being supplied to each. In certain exemplary embodiments, the systems and components for determining the stoichiometric ratio at which the upstream combustor 22 and the downstream combustor 24 operate include: a first testing component for testing the working fluid exhausted from the upstream combustor 22; and a second testing component for testing the working fluid exhausted from the downstream combustor 24. The first testing component and the second testing component each may include one of a sensor for detecting excess oxidant and a sensor for detecting unspent fuel. One or more CO sensors and one or more humidity sensors may also be used, as one of ordinary skill in the art will appreciate. The first testing location may include a location within a range of positions on the recirculation loop 10. The range of positions may be defined between the first extraction point 75 and, proceeding in an upstream direction, the upstream combustor 22. The second testing location may include a location within a range of positions on the recirculation loop 10. The range of positions may be defined between the second extraction point 76 and, proceeding in an upstream direction, the downstream combustor 24.

In certain embodiments, the systems and components for selectively extracting from the first extraction point 75 and the second extraction point 76 based on which of the upstream combustor 22 and the downstream combustor 24 is being operated at the preferred stoichiometric ratio includes a computerized control unit 65. In one preferred embodiment, the control unit 65 is configured to: extract working fluid from the first extraction point 75 during periods when the upstream combustor 22 operates at the preferred stoichiometric ratio; and extract working fluid from the second extraction point 76 during periods when the downstream combustor 24 operates at the preferred stoichiometric ratio.

As provided herein, the power plant of FIGS. 8 and 9 may be operated per novel control methods. In certain embodiments, such methods may include the steps of: recirculating at least a portion of the working fluid through the recirculation loop 10; controlling a compressed oxidant amount supplied to each of the upstream combustor 22 and the downstream combustor 24; controlling a fuel amount supplied to each of the upstream combustor 22 and the downstream combustor 24; controlling the power plant 9 such that each of the upstream combustor 22 and the downstream combustor 24 periodically operates at a preferred stoichiometric ratio; and selectively extracting the working fluid from a first extraction point 75 associated with the upstream combustor 22 and a second extraction point 76 associated with the downstream combustor 24 based upon which of the upstream 22 and the downstream combustor 24 operates at the preferred stoichiometric ratio. The step of selectively extracting the working fluid from the first 75 and the second extraction points 76 may include selecting to extract from the first extraction point 75 only during periods when the upstream combustor 22 operates at the preferred stoichiometric ratio, and selecting to extract working fluid from the second extraction point 76 only during periods when the downstream combustor 24 operates at the preferred stoichiometric ratio. In one preferred embodiment, for example, the upstream combustor 22 may be operated at the preferred stoichiometric ratio during low-load operation, and the downstream combustor 24 may be operated at the preferred stoichiometric ration during full operation. The step of selectively extracting working fluid from the first 75 and second extraction points 76 may include controlling the settings of the first 61 and second controllable extracted gas valves 61. The step of controlling the compressed oxidant amount supplied to each of the upstream and downstream combustors 22, 24 may include manipulating the settings of the first and second controllable oxidant valves 54, 68. The step of controlling the fuel amounts supplied to each of the upstream and downstream combustors 22, 24 may include the steps of manipulating the settings of the first and second controllable fuel valves 58, 59.

The step of controlling the power plant 9 such that each of the upstream combustor 22 and the downstream combustor 24 periodically operate at the preferred stoichiometric ratio may include using a computerized control unit 65 that is configured to control the settings of the first and second controllable oxidant valves 54 and the first 58 and second controllable fuel values 59. The preferred stoichiometric ratio may include a stoichiometric ratio of about 1, though the other ranges discussed herein are also possible.

In certain embodiments, the method may include the steps of: measuring a plurality of process variables of the power plant 9; determining an output requirement for the power plant 9; based on the measured process variables and the output requirement, determining a desired mode of operation for the power plant 9; determining a preferred stoichiometric combustor, the preferred stoichiometric combustor including whichever of the upstream combustor 22 and the downstream combustor 24 is preferred for operation at the preferred stoichiometric ratio given the desired mode of operation for the power plant 9 and a chosen criteria; and controlling the power plant 9 such that the preferred stoichiometric combustor operates at the preferred stoichiometric ratio. It will be appreciated that power plants configured as with dual combustion systems may choose to shut-down one of the combustion systems during a turndown mode of operation, thereby more efficiently satisfying a lower output requirement. Accordingly, in certain embodiments, the desired mode of operation includes a turndown mode of operation during which only one of the upstream combustor 22 and the downstream combustor 24 operates. In this case, the preferred stoichiometric combustor may include whichever of the upstream combustor 22 and the downstream combustor 24 operates during the turndown mode of operation. In certain embodiments, the upstream combustor 22 is the combustor that operates during the turndown mode of operation.

The chosen criteria for determining the preferred stoichiometric combustor may be any of several. In certain preferred embodiments, the chosen criteria relates to the efficiency level of the power plant 9. In this manner, the preferred stoichiometric combustor is the combustor that, when operated at the preferred stoichiometric ratio, promotes efficiency. The chosen criteria also may be related to economic considerations, i.e., the preferred stoichiometric combustor is the one that promotes the profits of the power plant 9.

In certain embodiments, the method of the present application may further include the steps of: determining a current stoichiometric ratio at which the preferred stoichiometric combustor operates; determining whether the current stoichiometric ratio is equal to the preferred stoichiometric ratio; and extracting working fluid from the extraction point associated with the preferred stoichiometric combustor if the current stoichiometric ratio is determined to be equal to the preferred stoichiometric ratio. In certain embodiments, this may include the steps of: measuring the compressed oxidant amount being supplied to the upstream and downstream combustors 22, 24; measuring the fuel amount being supplied to the upstream and downstream combustors 22, 24; and calculating the current stoichiometric ratio at which the preferred stoichiometric combustor operates based on the measured compressed oxidant amount being supplied to the upstream and downstream combustors 22, 24 and the measured fuel amounts being supplied to the upstream and downstream combustors 22, 24. In certain embodiments, the step of determining the current stoichiometric ratio at which the preferred stoichiometric combustor operates includes the steps of: if the upstream combustor 22 may include the preferred stoichiometric combustor, testing the working fluid exhausted from the upstream combustor 22; and if the downstream combustor 24 may include the preferred stoichiometric combustor, testing the working fluid exhausted from the downstream combustor 24. The working fluid exhausted from the upstream combustor 22 may be tested at a first test location by one of a sensor for detecting excess oxidant and a sensor for detecting unspent fuel. The first test location may include a location within a range of locations on the recirculation loop defined between the first extraction point 75 and, proceeding in an upstream direction, the upstream combustor 22. The working fluid exhausted from the downstream combustor 24 may be tested at a second test location by one of a sensor for detecting excess oxidant and a sensor for detecting unspent fuel. The second test location may include a location within a range of locations on the recirculation loop defined between the second extraction point 76 and, proceeding in an upstream direction, the downstream combustor 24. In this manner, the status of the exhaust prior to extraction may be tested to confirm desired properties.

In certain embodiments, the step of controlling the power plant 9 such that the preferred stoichiometric combustor operates at the preferred stoichiometric ratio includes the step of operating a feedback loop control mechanism that includes manipulating a control input of the power plant 9 based on the measured plurality of the process variables. The methods of operating a feedback loop control mechanism are discussed in more detail above. In certain cases, it will be appreciated that the step of measuring the plurality of process variables may include measuring the compressed oxidant amount and the fuel amount supplied to the preferred stoichiometric combustor and calculating a current stoichiometric ratio in the preferred stoichiometric combustor based on the measured compressed oxidant amount and fuel amount supplied to the preferred stoichiometric combustor. In certain embodiments, the control input may include the settings for whichever of the first and second controllable oxidant valves 54, 68 correspond to the preferred stoichiometric combustor and whichever of the first and second controllable fuel valves 58, 59 correspond to the preferred stoichiometric combustor.

In certain embodiments, the step of measuring the plurality of process variables may include measuring the compressed oxidant amounts and the compressed fuel amounts being supplied to each of the upstream and downstream combustors 22, 24. The step of calculating the current stoichiometric ratio in the preferred stoichiometric combustor may include balancing, in each of the upstream and downstream combustors 22, 24, the measured oxygen amount against the measured fuel amount to determine whether the preferred stoichiometric combustor ingests an excess fuel amount or an excess oxidant amount that is present in the working fluid from whichever of the upstream and downstream combustors 22, 24 is not the preferred stoichiometric combustor.

In certain embodiments, the step of measuring the plurality of process variables may include testing a working fluid content at a position on the recirculation loop that is both downstream of the preferred stoichiometric combustor and upstream of whichever of the upstream and downstream combustors 22, 24 is not the preferred stoichiometric combustor. The control input may include at least one of the fuel amount supplied to the upstream combustor 22, the fuel amount supplied to the downstream combustor 24, the compressed oxidant amount supplied to the upstream combustor 22, and the compressed oxidant amount supplied to the downstream combustor 24. The step of testing the working fluid content may include measuring at least one of an oxidant content and an unspent fuel content of the working fluid, which may further include the step of calculating a current stoichiometric ratio in the preferred stoichiometric combustor based on the testing of the working fluid content.

In certain exemplary embodiments, the method of the present application includes controlling the power plant 9 such that both of the upstream combustor 22 and the downstream combustor 24 periodically operate at the preferred stoichiometric ratio during the same period of time. In this case, selectively extracting the working fluid from the first extraction point 75 and the second extraction point 76 may include extracting working fluid from both the first extraction point 75 and the second extraction point 76 when both combustors 22, 24 operate at the preferred stoichiometric ratio. As shown in FIGS. 8 and 9, the two extracted gas flows may be combined at a combining point 86. That is, the method of the present application may include the step of combining the working fluid extracted from the first extraction point 75 and the working fluid extracted from the second extraction point 76. The method may further include the step of controllably combining the two extracted flows of working fluid such that a combined flow of extracted working fluid includes a desired characteristic. It will be appreciated that this may be done by controlling the settings of the controllable extracted gas valves 61 that are included at each extraction point 75, 76. Depending on the downstream applications for which the extracted gas is extracted, it is beneficial to have the ability to provide the extracted gas at varying pressure levels or temperatures. This may be achieved by mixing the gases extracted from different points on the recirculation loop 10 in desired or controlled amounts. As shown in FIG. 9, the first extraction point 75 extracts gas from a region of relative high temperature and high pressure, while the second extraction point 76 extracts gas from a region of relatively low temperature and low pressure. It will be appreciated that by mixing the two flows in a controlled manner, desired extracted gas characteristics within the range of characteristics defined by the differing extraction location may be achieved.

Turning now to FIGS. 10-13, schematic drawings illustrating configurations of alternative power plants that employ exhaust gas recirculation and a single combustion system are provided. It will be appreciated that the power plant 9 of these figures includes many of the same components as the power plants described above and that these components may be employed in much the same manner at that described elsewhere in this application. As stated, any of the descriptions pertaining to any of the power plants that one of ordinary skill in the art would appreciate as not being limited to a specific configuration is applicable to all the configurations, particularly as such alternatives may be described in the claims or any amendments made thereto. In certain embodiments, the power plant 9 is configured to include a recirculation loop 10 about which a working fluid is recirculated. As before, the recirculation loop 10 may include a plurality of components configured to accept an outflow of working fluid from a neighboring upstream component and provide an inflow of working fluid to a neighboring downstream component. In this case, the recirculation loop 10 includes a recirculation compressor 12; a combustor 22 positioned downstream of the recirculation compressor 12; a turbine 30 positioned downstream of the combustor 22; and a recirculation conduit 40 configured to direct the outflow of working fluid from the turbine 30 to the recirculation compressor 12. The power plant 9 is configured to have a single combustion system. As such, the recirculation loop 10 may be configured to prevent the input of combustion gases at all locations except for an input related to the combustor 22. As shown, the power plant 9 may further include a first extraction point 75 and a second extraction point 76 positioned on the recirculation loop 10. The outflow of working fluid from the turbine 30 includes exhaust gases, which, via the recirculation conduit 40, are directed to the recirculation compressor 12. The recirculation compressor 12 is configured to compress the exhaust gases such that the outflow of working fluid from the recirculation compressor 12 includes compressed exhaust gases;

The first extraction point 75 may include a controllable extraction valve 61 that is controllable to at least two settings: a closed setting that prevents the extraction of working fluid and an open setting that allows the extraction of working fluid. The second extraction point 76 may include a controllable extraction valve 61 that is controllable to at least two settings: a closed setting that prevents the extraction of working fluid and an open setting that allows the extraction of working fluid.

The power plant 9 may be operated or controlled such that the combustor 22 at least periodically operates at a preferred stoichiometric ratio. The preferred stoichiometric ratios may be similar to those ratios discussed above. To achieve this type of operation, a compressed oxidant amount and a fuel amount supplied the combustor 22 may be controlled. The compressed oxidant amount may be controlled by an oxidant compressor 11, an oxidant conduit 52 that is configured to direct compressed oxidant derived from the oxidant compressor 11 to the combustor 22, and a controllable oxidant valve 54 disposed on the oxidant conduit that is controllable to at least two open settings that allow delivery of differing compressed oxidant amounts to the combustor 22. The fuel amount may be controlled by a controllable fuel valve 58 that has at least two open settings that allow delivery of differing fuel amounts to the combustor 22. It will be appreciated that the power plant 9 may be controlled such that the combustor 22 at least periodically operates at the preferred stoichiometric ratio via a computerized control unit 65 that is configured to control the settings of the controllable oxidant valve 54 and the controllable fuel valve 58, and may include systems for determining a current stoichiometric ratio at which the combustor 22 operates, the various systems for which are discussed in detail above, whether the current stoichiometric ratio is equal to the preferred stoichiometric ratio, as well as a control feedback loop mechanism that achieves the desired modes of operations. As discussed in more detail below, the computerized control unit 65 may be configured to selectively extract working fluid from at least one of the first extraction point 75 and the second extraction point 76 based on whether the current stoichiometric ratio in the combustor 22 is determined to be equal to the preferred stoichiometric ratio, as well as the intended downstream uses of the extracted working fluid.

In certain embodiments, the power plant 9 includes a recirculation conduit 40 that is configured to collect exhaust gases from the turbine 30 and direct the exhaust gases to an intake of the recirculation compressor 12. The recirculation conduit 40 may further include a heat recovery steam generator, the heat recovery steam generator including a boiler, the heat recovery steam generator being configured such that the exhaust gases from the turbine 30 includes a heat source for the boiler. The recirculation conduit 40 may include a chiller 44 and a blower 46 positioned thereon. The chiller 44 may be configured to controllably remove an amount of heat from the exhaust gases flowing through the recirculation conduit 40 such that a more desirable temperature is achieved at the intake of the recirculation compressor 12. The blower 46 may be configured to controllably circulate the exhaust gases flowing through the recirculation conduit 40 such that a more desirable pressure is achieved at the intake of the recirculation compressor 12.

The power plant 9 may include instruments, sensors, and systems for determining a property of characteristic of the working fluid at the extraction points 75, 76. These may include direct measurement of the characteristic or calculation based on other measured process variables. The characteristic may include any property of the working fluid, such as, pressure and temperature. As stated, the extracted working fluid has economic value in certain industrial and other applications. It will be appreciated that if the extracted working fluid may be efficiently delivered with desired characteristics given an intended application, such as at a desired pressure or temperature, the value of it is increased. In certain embodiments, the means for determining the characteristic of the working fluid at the first extraction point 75 and the second extraction point 76 may include a pressure sensor and/or a temperature sensor. The computerized control unit 65 may be configured to selectively extract the working fluid from only or just the first extraction point 75, just the second extraction point 76, or both the first and second extraction point 75, 76 based on the characteristic of the working fluid that is determined to be at each of the extraction points 75, 76. The computerized control unit 65 may do this via controlling the settings of the first and second controllable extraction valves 61.

The computerized control unit 65 may be configured to determine a preferred value for the characteristic of the working fluid. This may be done via determining an intended downstream application for the extracted working fluid, which could be completed via consulting an operator entered value or otherwise. The system then could determine a preferred value for the characteristic of the working fluid based on what would be a preferred value given the intended downstream application.

Figure 10:
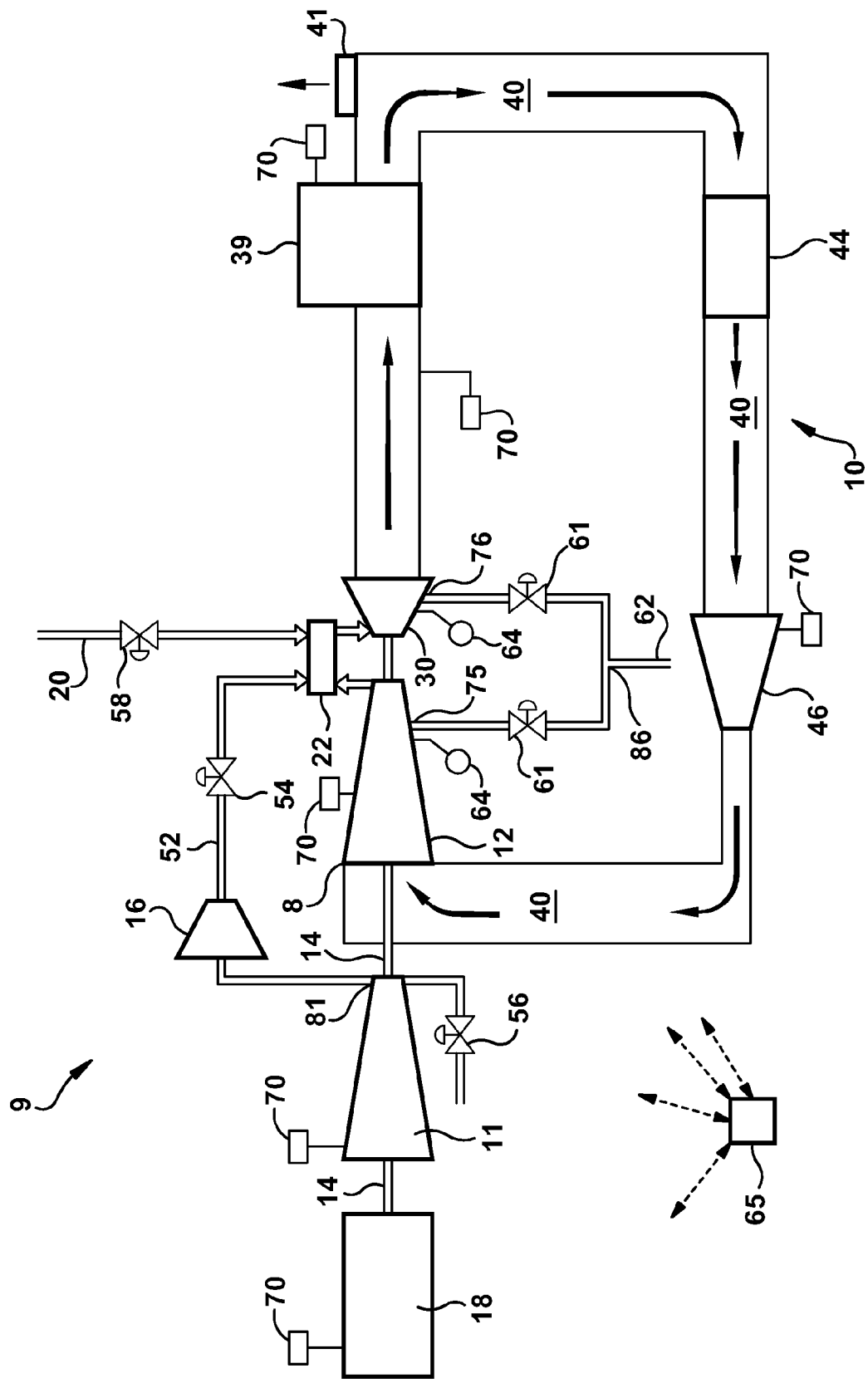
FIG. 10 is a schematic drawing illustrating a configuration of an alternative power plant employing exhaust gas recirculation and a single combustion system.
Figure 11:
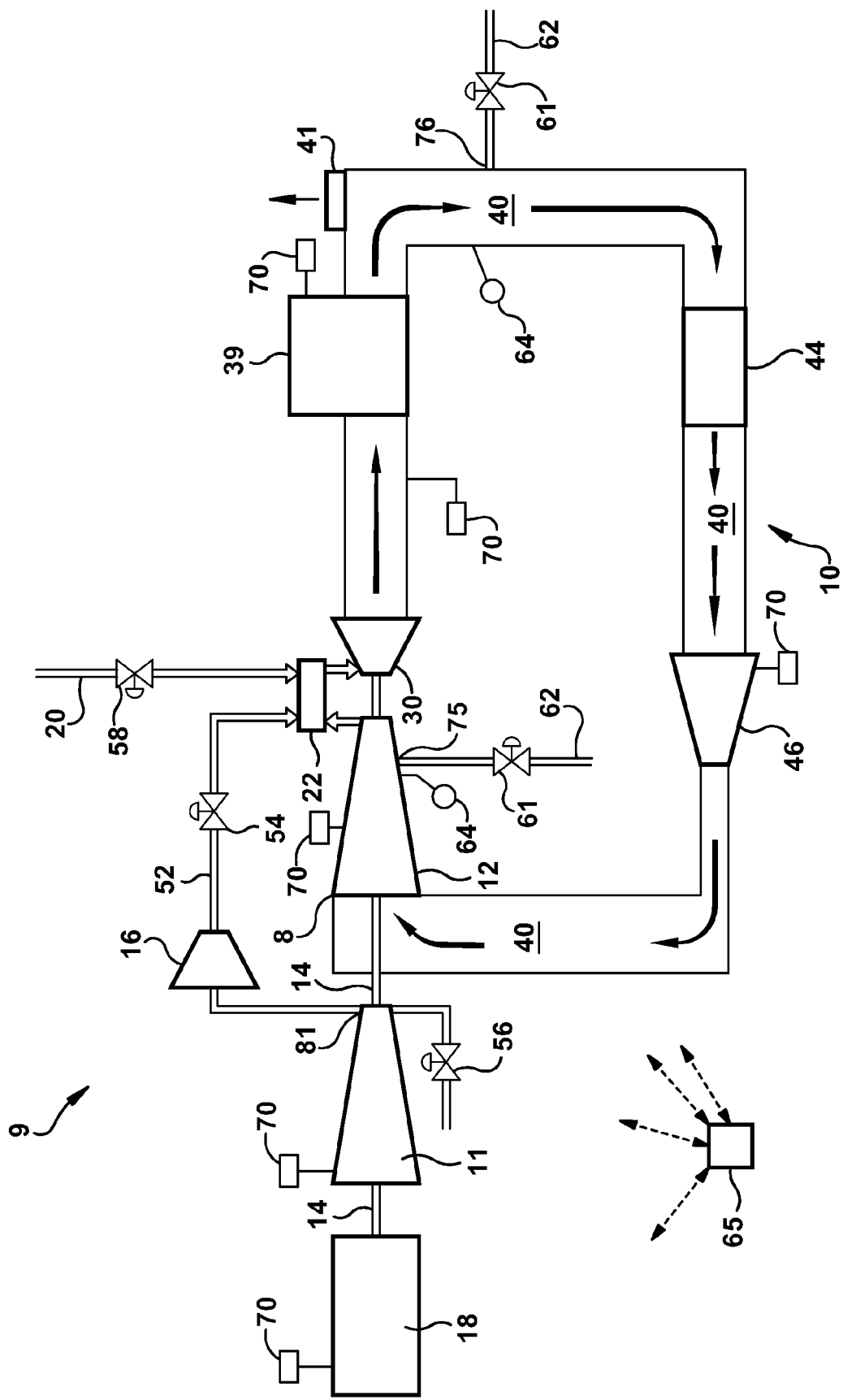
FIG. 11 is a schematic drawing illustrating an alternative configuration of a power plant employing exhaust gas recirculation and a single combustion system.
Figure 12:
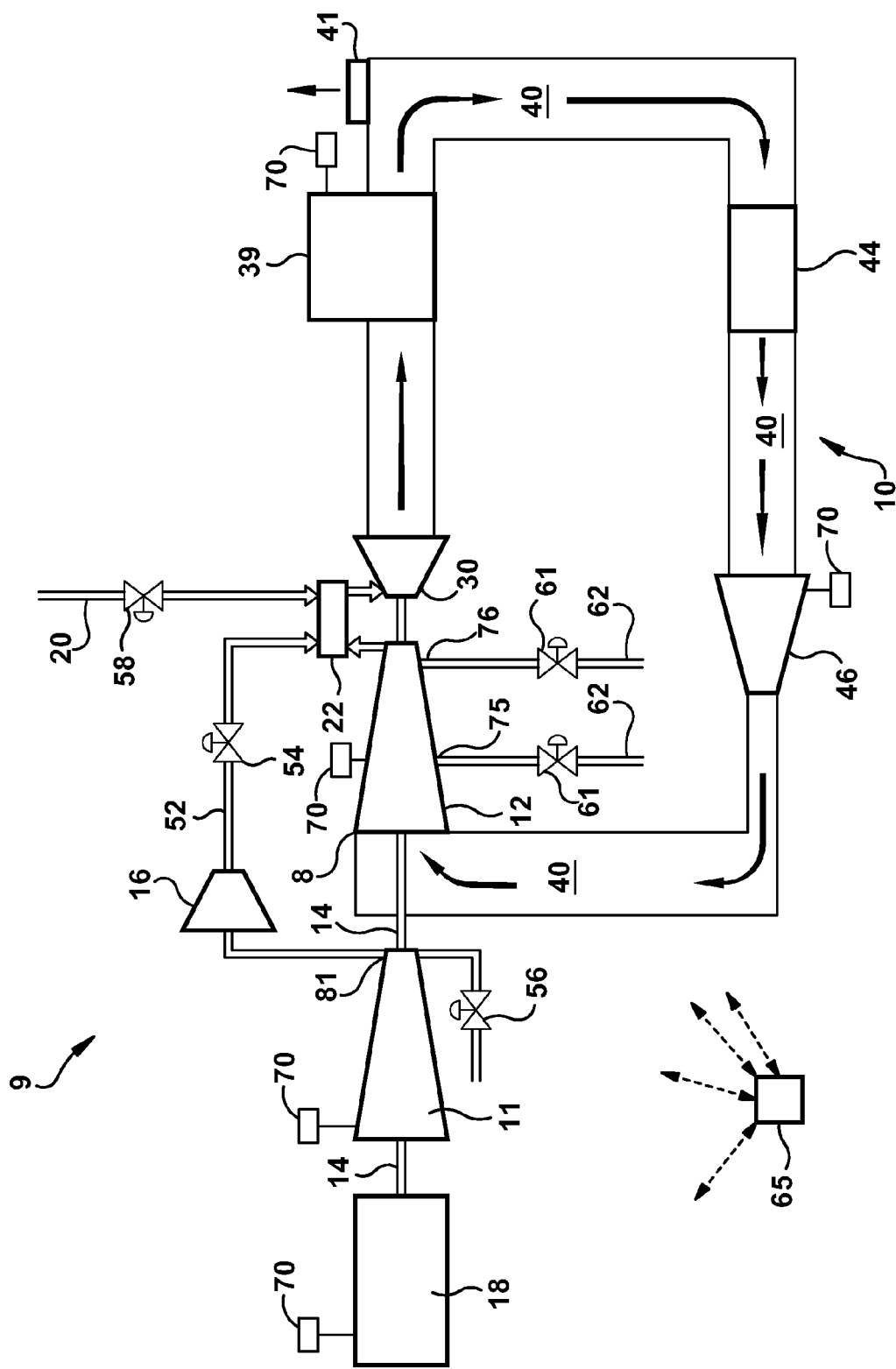
FIG. 12 is a schematic drawing illustrating an alternative configuration of a power plant employing exhaust gas recirculation and a single combustion system.
Figure 13:
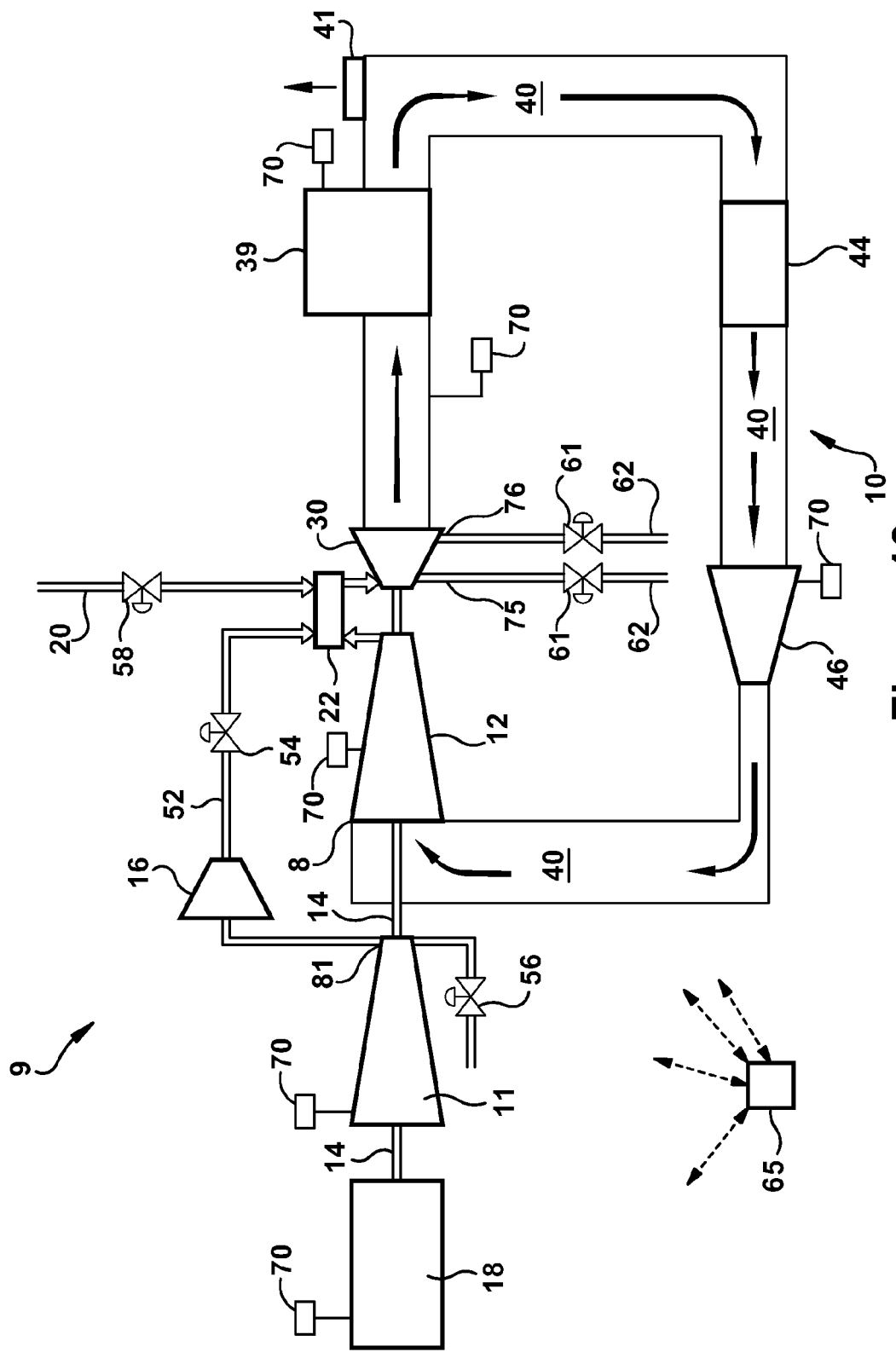
FIG. 13 is a schematic drawing illustrating an alternative configuration of a power plant employing exhaust gas recirculation and a single combustion system.

The extraction points 75, 76 may include various locations. While a few preferred embodiments relating to extraction point configuration are provided in FIGS. 10-13, it will be appreciated that others are possible. As shown in FIG. 10, the first extraction point 75 may have a location within the recirculation compressor 12, and the second extraction point 76 may have a location within the turbine 30. As shown in FIG. 11, the first extraction point 75 may have a location within the recirculation compressor 12, and the second extraction point 76 may have a location within the recirculation conduit 40. As shown in FIG. 12, the first extraction point 75 may have a first location within the recirculation compressor 12, and the second extraction point 76 may have a second location within the recirculation compressor 12. As shown in FIG. 13, the first extraction point 75 may have a first location within the turbine 30, and the second extraction point 76 may have a second location within the turbine 30. The advantages of these configurations are discussed in more detail below.

The present application further describes a method of controlling a power plant that includes configurations discussed above in relation to FIGS. 10-13. In general, these methods may include the steps of: recirculating at least a portion of the working fluid through the recirculation loop; controlling the power plant such that the combustor 22 at least periodically operates at a preferred stoichiometric ratio; and extracting working fluid from at least one of a first extraction point 75 and a second extraction point 76 positioned on the recirculation loop 10 during the periods when the combustor 22 operates at the preferred stoichiometric ratio. The step of controlling the power plant such that the combustor 22 periodically operates at the preferred stoichiometric ratio may include the steps of controlling a compressed oxidant amount and a fuel amount supplied to the combustor 22.

The method may further include the steps of: determining a characteristic of the working fluid at the first extraction point 75; determining a characteristic of the working fluid at the second extraction point 76; and, based on the characteristic of the working fluid at the first and second extraction points 75,76 selectively extracting the working fluid from just the first extraction point 75, just the second extraction point 76, or both the first and second extraction points 75, 76. Based on a downstream application, the method may determine a preferred value for the characteristic of the working fluid, which may also be used to selectively extract working fluid from the extraction points 75, 76. This type of method of operation may result in working fluid being extracted from both the first extraction point 75 and the second extraction point 76 at the same time. In this instance, the method may controllably mix the extracted flows of working fluid from both extraction points 75, 76 so as to create a combined flow of extracted working fluid that has a characteristic consistent with the preferred value for the characteristic. As before, the preferred value for the characteristic of the working fluid may be based on an intended downstream application. A computerized control unit 65 may be configured to control the settings of the various valves and other components discussed herein so that the desired modes of operation are achieved.

In certain embodiments, the step of selectively extracting the working fluid from just the first extraction point 75, just the second extraction point 76, or both the first and second extraction points 75, 76 includes the steps of: when the characteristic of the working fluid at the first extraction point 75 is within a predetermined range relative to the preferred value for the characteristic, extracting from just the first extraction point 75; when the characteristic of the working fluid at the second extraction point 76 is within a predetermined range relative to the preferred value for the characteristic, extracting from just the second extraction point 76; when the preferred value for the characteristic is within a predetermined range nested between the characteristic of the working fluid at the first extraction point 75 and the characteristic of the working fluid at the second extraction point 76, and extracting from both the first and second extraction points 75, 76. In this manner, the method may employ just one extraction point when the desired characteristic may be achieved this way, or extract from both extraction points when mixing may be employed to deliver the extracted gases in a more desirable state given a downstream application. In certain embodiments, these steps may include the following: when the characteristic of the working fluid at the first extraction point 75 is approximately equal to the preferred value for the characteristic, extracting from the first extraction point 75; when the characteristic of the working fluid at the second extraction point 76 is approximately equal to the preferred value for the characteristic, extracting from the second extraction point 76; and when the preferred value for the characteristic falls in between the characteristic of the working fluid at the first extraction point 75 and the characteristic of the working fluid at the second extraction point 76, extracting from both the first and second extraction points 75, 76. When the method operates to extract working fluid from both extraction points 75, 76, a mixing step, as mentioned, may be employed to create a combined flow that is more desirable. In certain embodiments, this may be achieved by controlling the setting of the first controllable extraction valve 61 such that a first predetermined amount of working fluid is extracted from the first extraction point 75; controlling the setting of the second controllable extraction valve 61 such that a second predetermined amount of working fluid is extracted from the second extraction point 76; and combining the first predetermined amount of working fluid with the second predetermined amount of working fluid at a combining junction such that the combined flow of extracted working fluid is formed. It will be appreciated that, given the characteristic of the working fluid at the first extraction point 75 and the second extraction point 76, the first predetermined amount of working fluid extracted from the first extraction point 75 and the second predetermined amount of working fluid extracted from the second extraction point 76 may include predetermined amounts of working fluid that, once mixed, result in the combined flow of extracted working fluid having the preferred value for the characteristic. As stated, the characteristic may be one of pressure and temperature, though others are possible.

The extraction point locations may be predetermined to provide desired operation, efficiency, and flexibility in delivering extracted flows having desired characteristics. Generally, the first extraction point 75 may have a predetermined first location within the recirculation loop 10 and the second extraction point 76 may have a predetermined second location within the recirculation loop 10. In one preferred embodiments, the first predetermined location within the recirculation loop 10 and the second predetermined location within the recirculation loop 10 are selected such that the working fluid at each include a dissimilar first characteristic and a similar second characteristic. In this case, the working fluid extracted from the first extraction point 75 and the second extraction point 76 may be mixed to achieve a wide range of levels for the first characteristic, while the mixing has little effect on the resulting second characteristic, which will remain at about the level of the similar second characteristics of the extracted flows. In other cases, the first predetermined location within the recirculation loop 10 and the second predetermined location within the recirculation loop 10 may be selected such that the working fluid at each includes a dissimilar first characteristic and a dissimilar second characteristic. This time, the working fluid extracted from the first extraction point 75 and the second extraction point 76 may be mixed to achieve a wide range of first characteristic values and a wide range of second characteristic values.

Referring to FIG. 10, it will be appreciated that the position within the recirculation compressor 12 for the first extraction point 75 and the location within the turbine 30 for the second extraction point 76 may be selected such that the dissimilar first characteristic is pressure and the similar second characteristic is temperature. Referring to FIG. 11, it will be appreciated that the position within the recirculation compressor 12 for the first extraction point 75 and the location within the recirculation conduit 40 for the second extraction point 76 may be selected such that the dissimilar first characteristic is pressure and the similar second characteristic is temperature. The location for the second extraction point 76 may be varied to produce other results, such as producing a dissimilar temperature characteristic. Another possible configuration includes positioning first extraction point 75 in the turbine 30 and the second extraction point 76 in the recirculation conduit 40 so that dissimilar pressure and dissimilar temperature characteristics at the two extraction locations are achieved. It will be appreciated that this type of arrangement may provide great flexibility in the mixing of extracted flows to achieve a broad range of values for each of the pressure and temperatures characteristics.

In another embodiment, as illustrated in FIG. 12, the first extraction point 75 may have a first predetermined location within the recirculation compressor 12, which may be selected to provide a desired pressure or temperature level for the extracted working fluid during an anticipated first mode of operation for the power plant 9. The second extraction point 76 may have a second predetermined location within the recirculation compressor 12, which may be selected to provide the desired pressure or temperature level for extracted working fluid during an anticipated second mode of operation for the power plant 9. It will be appreciated that this configuration provides the flexibility of extracting working fluid at a consistent pressure or temperature level, i.e., the desired pressure or temperature level, no matter if the power plant 9 is operating in the first or second mode of operation. In a preferred embodiment, the modes coincide with a base load mode of operation and a turndown mode of operation. It will be appreciated that this configuration further provides the advantageous alternative of extracting at different pressure or temperature levels during those times when the operation mode of the power plant 9 remains unchanged.

In another embodiment, as illustrated in FIG. 13, the first extraction point 75 may have a first predetermined location within the turbine 30, which may be selected to provide a desired pressure or temperature level for extracted working fluid during an anticipated first mode of operation for the power plant 9. The second extraction point 76 may have a second predetermined location within the turbine 30, which may be selected to provide the desired pressure or temperature level for extracted working fluid during an anticipated second mode of operation for the power plant 9. In this case, it will be appreciated that the configuration provides the flexibility of extracting working fluid at a consistent pressure or temperature level, i.e., the desired pressure or temperature level, no matter if the power plant 9 is operating in the first or second mode of operation. In a preferred embodiment, the modes coincide with a base load mode of operation and a turndown mode of operation. It will be appreciated that this configuration further provides the advantageous alternative of extracting at different pressure or temperature levels during those times when the operation mode of the power plant 9 remains unchanged.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A method of controlling a power plant that comprises a working fluid and a recirculation loop, wherein the power plant includes a combustor operably connected to a turbine, and wherein the recirculation loop comprises a recirculation compressor, the combustor positioned downstream of the recirculation compressor, the turbine positioned downstream of the combustor, and a recirculation conduit configured to direct an outflow of the working fluid from the turbine to the recirculation compressor, the method including the steps of:

recirculating at least a portion of the working fluid through the recirculation loop;

controlling the power plant such that the combustor at least periodically operates at a preferred stoichiometric ratio by controlling an amount of a compressed oxidant supplied to the combustor at an oxidant input and an amount of a fuel supplied to the combustor at a fuel input, wherein the recirculation loop is configured to prevent the input of the compressed oxidant and the fuel to all locations except for the oxidant input and the fuel input, respectively, occurring in the combustor;

extracting the working fluid from a first extraction point and a second extraction point positioned on the recirculation loop during periods when the combustor operates at the preferred stoichiometric ratio;

determining a characteristic of the working fluid at the first extraction point;

determining the characteristic of the working fluid at the second extraction point; and based on the characteristic of the working fluid at the first extraction point and the characteristic of the working fluid at the second extraction point, extracting the working fluid from both the first extraction point and the second extraction point;

determining a preferred value for the characteristic of the working fluid based on an intended downstream application; and controllably mixing the working fluid extracted from the first extraction point and the working fluid extracted from the second extraction point such that a combined flow of extracted working fluid comprises the preferred value for the characteristic of the working fluid.

2. The method according to claim 1, wherein:

the first extraction point comprises a first controllable extraction valve, wherein the first controllable extraction valve is controllable to at least three settings: a closed setting that prevents extraction of the working fluid at the first extraction point and two open settings that allow for the extraction of differing levels of the working fluid at the first extraction point;

the second extraction point comprises a second controllable extraction valve, wherein the second controllable extraction valve is controllable to at least three settings: a closed setting that prevents extraction of the working fluid at the second extraction point and two open settings that allow for the extraction of differing levels of the working fluid at the second extraction point; and wherein extracting the working fluid from the first extraction point and the second extraction point comprises controlling the settings of the first and second controllable extraction valves, respectively.

3. The method according to claim 2, wherein:

the step of controlling the amount of the compressed oxidant supplied to the combustor includes: compressing oxidant in an oxidant compressor to generate the compressed oxidant; directing the compressed oxidant derived from the oxidant compressor through an oxidant conduit that includes a controllable oxidant valve that is controllable to at least two open settings that allow controlled delivery of the amount of the compressed oxidant to the combustor; and manipulating the at least two open settings of the controllable oxidant valve to vary the amount of the compressed oxidant delivered to the combustor; and the step of controlling the amount of the fuel amount supplied to the combustor includes: directing the fuel derived from a fuel supply through a controllable fuel valve to the combustor, wherein the controllable fuel valve is controllable to at least two open settings that allow controlled delivery of the amount of the fuel to the combustor; and manipulating the at least two open settings of the controllable fuel valve to vary the amount of the fuel delivered to the combustor.

4. The method according to claim 3, wherein:

the outflow of the working fluid from the turbine comprises exhaust gases, which, via the recirculation conduit, are directed to the recirculation compressor;

the recirculation compressor is configured to compress the exhaust gases such that the outflow of the working fluid from the recirculation compressor comprises compressed exhaust gases;

the step of controlling the power plant such that the combustor at least periodically operates at the preferred stoichiometric ratio includes using a computerized control unit that is configured to control the settings of the controllable oxidant valve and the controllable fuel value; and the preferred stoichiometric ratio comprises a stoichiometric ratio of about 1.

5. The method according to claim 1, wherein the preferred stoichiometric ratio comprises a range of stoichiometric ratios between 0.75 and 1.25.

6. The method according to claim 1, wherein the preferred stoichiometric ratio comprises a range of stoichiometric ratios between 0.9 and 1.1.

7. The method according to claim 2, wherein the step of controllably mixing the working fluid extracted from the first extraction point and the second extraction point includes the steps of:

controlling the setting of the first controllable extraction valve such that a first predetermined amount of the working fluid is extracted from the first extraction point;

controlling the setting of the second controllable extraction valve such that a second predetermined amount of the working fluid is extracted from the second extraction point; and combining the first predetermined amount of the working fluid with the second predetermined amount of the working fluid at a combining junction such that a combined flow of the working fluid extracted from the first extraction point and from the second extraction point is formed;

wherein, given the characteristic of the working fluid at the first extraction point and the the characteristic of the working fluid at the second extraction point, the first predetermined amount of the working fluid extracted from the first extraction point and the second predetermined amount of the working fluid extracted from the second extraction point comprise amounts of the working fluid that, once mixed, result in the combined flow of the working fluid having the preferred value for the characteristic.

8. The method according to claim 1, further comprising the step of determining the intended downstream application for the working fluid extracted from the first extraction point and from the second extraction point;

wherein the preferred value for the characteristic of the working fluid is based on a predetermined preferred value given the intended downstream application.

9. The method according to claim 8, wherein extracting the working fluid from the first extraction point and the second extraction point comprises the steps of:

when the preferred value for the characteristic is within a predetermined range nested between the characteristic of the working fluid at the first extraction point and the characteristic of the working fluid at the second extraction point, extracting the working fluid from the first extraction point and the second extraction point.

10. The method according to claim 1, wherein the characteristic of the working fluid comprises pressure or temperature.

11. The method according to claim 1, wherein:
the first extraction point comprises a predetermined first location within the recirculation loop, wherein the predetermined first location is at the recirculation compressor, at the turbine, or downstream of the turbine and upstream of the recirculation compressor; and
the second extraction point comprises a predetermined second location within the recirculation loop, wherein the predetermined second location is at the recirculation compressor, at the turbine, or downstream of the turbine and upstream of the recirculation compressor.

12. The method according to claim 11, wherein:
the predetermined first location is within the recirculation compressor; and
the predetermined second location is within the turbine.

13. The method according to claim 11, wherein:
the predetermined first location is within the recirculation compressor; and
the predetermined second location is within the recirculation conduit.

14. The method according to claim 11, wherein:
the predetermined first location is within the turbine; and
the predetermined second location is within the recirculation conduit.

15. The method according to claim 1, wherein:
the first extraction point comprises a first location within the recirculation compressor, the first location being selected because the first location coincides with a desired pressure or temperature level for the working fluid at the first location during a first mode of operation for the power plant; and
the second extraction point comprises a second location within the recirculation compressor, the second location being selected because the second location coincides with the desired pressure or temperature level for the working fluid at the second location during a second mode of operation for the power plant;
and wherein the method further comprises the step of extracting the working fluid from the first extraction point at the first location when the power plant operates in the first mode of operation, and extracting the working fluid from the second extraction point at the second location when the power plant operates in a second mode of operation.

16. The method according to claim 15, wherein the first mode of operation comprises a base load mode of operation and the second mode of operation comprises a turndown mode of operation.

17. The method according to claim 1, wherein:
the first extraction point comprises a first location within the turbine, the first location being selected because the first location coincides with a desired pressure or temperature level for the working fluid during a first mode of operation for the power plant; and
the second extraction point comprises a second location within the turbine, the second location being selected because the second location coincides with the desired pressure or temperature level for the working fluid during a second mode of operation for the power plant;
further comprising the step of extracting the working fluid from the first extraction point when the power plant operates in the first mode of operation, and extracting the working fluid from the second extraction point when the power plant operates in a second mode of operation.

18. The method according to claim 17, wherein the first mode of operation comprises a base load mode of operation and the second mode of operation comprises a turndown mode of operation.

19. The method according to claim 1, further comprising the steps of:
dumping the working fluid extracted at the first extraction point, the second extraction point, or both to atmosphere.

20. A power plant comprising:
a recirculation loop about which a working fluid is recirculated, the recirculation loop comprising a plurality of components configured to accept an outflow of the working fluid from a neighboring upstream component and provide an inflow of the working fluid to a neighboring downstream component, wherein the recirculation loop includes: a recirculation compressor; a combustor positioned downstream of the recirculation compressor; a turbine positioned downstream of the combustor; and a recirculation conduit configured to direct the outflow of the working fluid from the turbine as the inflow of the working fluid to the recirculation compressor;
a first extraction means for extracting the working fluid from a first extraction point on the recirculation loop, wherein the first extraction point is located in the recirculation compressor, in the turbine, or in the recirculation conduit;
a second extraction means for extracting the working fluid from a second extraction point on the recirculation loop, wherein the second extraction point is located in the recirculation compressor, in the turbine, or in the recirculation conduit;
means for controlling the power plant such that the combustor operates at least in periods at a preferred stoichiometric ratio; and
wherein the means for controlling the power plant comprises a computerized control unit configured to control extraction of the working fluid from the first extraction point, by the first extraction means, and from the second extraction point, by the second extraction means, during periods when the combustor operates at the preferred stoichiometric ratio, wherein the computerized control unit is configured to control mixing of the working fluid extracted from the first extraction point and the working fluid extracted from the second extraction point to generate a combined working fluid having a preferred value for a characteristic of the combined working fluid based on an intended downstream application.

21. The power plant according to claim 20, wherein:
the means for controlling the power plant such that the combustor operates at least in the periods at the preferred stoichiometric ratio comprises means for controlling an amount of a compressed oxidant supplied to the combustor and means for controlling an amount of a fuel supplied to the combustor;
the first extraction means for extracting the working fluid comprises a first controllable extraction valve at the first extraction point, and wherein the first controllable extraction valve is controllable to at least two settings: a closed setting that prevents extraction of the working fluid and an open setting that allows the extraction of the working fluid; and
the second extraction means for extracting the working fluid comprises a second controllable extraction valve at the second extraction point, and wherein the second controllable is controllable to at least two settings: a closed setting that prevents extraction of the working fluid and an open setting that allows the extraction of the working fluid.

22. The power plant according to claim 21, wherein:
the means for controlling the amount of the compressed oxidant supplied to the combustor includes an oxidant compressor, an oxidant conduit that is configured to direct the compressed oxidant derived from the oxidant compressor to the combustor, and a controllable oxidant valve disposed on the oxidant conduit that is controllable to at least two open settings that allow delivery of the amount of the compressed oxidant to the combustor and manipulating the at least two open settings of the controllable oxidant valve to vary the amount of the compressed oxidant delivered to the combustor; and
the means for controlling the amount of the fuel supplied to the combustor comprises a combustor fuel supply that includes a controllable fuel valve, the controllable fuel valve being controllable to at least two open settings that allow delivery of the amount of the fuel to the combustor; and manipulating the at least two open settings of the controllable fuel valve to vary the amount of the fuel delivered to the combustor.

23. The power plant according to claim 22, wherein:
the outflow of the working fluid from the turbine comprises exhaust gases, which, via the recirculation conduit, are directed to the recirculation compressor;
the recirculation compressor is configured to compress the exhaust gases such that the outflow of the working fluid from the recirculation compressor comprises compressed exhaust gases; and wherein the computerized control unit that is configured to control the settings of the controllable oxidant valve and the controllable fuel valve and means for determining a current stoichiometric ratio at which the combustor operates and whether the current stoichiometric ratio is equal to the preferred stoichiometric ratio.

24. The power plant according to claim 23, wherein the preferred stoichiometric ratio comprises a stoichiometric ratio of between 0.75 and 1.25.

25. The power plant according to claim 23, wherein the preferred stoichiometric ratio comprises a stoichiometric ratio of between 0.9 and 1.1.

26. The power plant according to claim 23, wherein the means for determining the current stoichiometric ratio at which the combustor operates comprises:
means for measuring the amount of the compressed oxidant being supplied to the combustor and means for measuring the amount of the fuel being supplied to the combustor; and
the computerized control unit being configured to calculate the current stoichiometric ratio at which the combustor operates based on a measurement of the amount of the compressed oxidant and a measurement of the amount of the fuel being supplied to the combustor.

27. The power plant according to claim 26, wherein the means for determining the current stoichiometric ratio at which the combustor operates comprises a testing means for testing the working fluid exhausted from the combustor, the testing means comprises at least one of a sensor for detecting excess oxidant and a sensor for detecting unspent fuel; and
the testing location comprises a location within a range of positions on the recirculation loop, the range of positions being defined between an inlet to the turbine, and proceeding in an downstream direction, an inlet to the combustor.

28. The power plant according to claim 23, wherein the computerized control unit is configured to selectively extract the working fluid from at least one of the first extraction point or the second extraction point based on whether the current stoichiometric ratio in the combustor is determined to be equal to the preferred stoichiometric ratio.

29. The power plant according to claim 23, wherein:
the recirculation conduit is configured to collect a portion of the exhaust gases from the turbine and direct the portion of the exhaust gases to an intake of the recirculation compressor;
the recirculation conduit further comprises a heat recovery steam generator, the heat recovery steam generator including a boiler, the heat recovery steam generator being configured such that the exhaust gases from the turbine comprises a heat source for the boiler;
the recirculation conduit includes at least one of a chiller and a blower positioned thereon, the chiller being configured to controllably remove an amount of heat from the exhaust gases flowing through the recirculation conduit such that a more desirable temperature is achieved at the intake of the recirculation compressor, and the blower being configured to controllably circulate the exhaust gases flowing through the recirculation conduit such that a more desirable pressure is achieved at the intake of the recirculation compressor.

30. The power plant according to claim 23, further comprising:
means for determining a characteristic of the working fluid at the first extraction point;
means for determining the characteristic of the working fluid at the second extraction point; and
wherein the computerized control unit is configured to selectively extract the working fluid from just the first extraction point, just the second extraction point, or both the first extraction point and the second extraction point based on the characteristic of the working fluid at the first extraction point and the second extraction point.

31. The power plant according to claim 30, wherein:
the first extraction point comprises a location within the recirculation compressor; and
the second extraction point comprises a location within the turbine.

32. The power plant according to claim 30, wherein:
the first extraction point comprises a location within the recirculation compressor; and
the second extraction point comprises a location within the recirculation conduit.

33. The power plant according to claim 30, wherein:
the first extraction point comprises a location within the turbine; and
the second extraction point comprises a location within the recirculation conduit.

34. The power plant according to claim 30, wherein:
the first extraction point comprises a first location within the recirculation compressor, the first location being selected to provide a desired pressure or temperature level for the working fluid during a first mode of operation for the power plant; and
the second extraction point comprises a second location within the recirculation compressor, the second location being selected to provide the desired pressure or temperature level for the working fluid during a second mode of operation for the power plant;

the computerized control unit is configured to extract the working fluid from the first extraction point when the power plant operates in the first mode of operation and extract the working fluid from the second extraction point when the power plant operates in the second mode of operation.

35. The power plant according to claim 34, wherein the first mode of operation comprises a base load mode of operation and the second mode of operation comprises a turndown mode of operation.

36. The power plant according to claim 30, wherein:
the first extraction point comprises a first location within the turbine, the first location being selected to provide a desired pressure or temperature level for the working fluid during a first mode of operation for the power plant; and
the second extraction point comprises a second location within the turbine, the second location being selected to provide the desired pressure or temperature level during a second mode of operation for the power plant;
the computerized control unit is configured to extract the working fluid from the first extraction point when the power plant operates in the first mode of operation, and extract the working fluid from the second extraction point when the power plant operates in the second mode of operation.

37. The power plant according to claim 36, wherein the first mode of operation comprises a base load mode of operation and the second mode of operation comprises a turndown mode of operation.

* * * * *